US008509495B2

(12) United States Patent
Xu et al.

(10) Patent No.: US 8,509,495 B2
(45) Date of Patent: Aug. 13, 2013

(54) SUBCUTANEOUS VEIN PATTERN DETECTION VIA MULTI-SPECTRAL IR IMAGING IN AN IDENTITY VERIFICATION SYSTEM

(75) Inventors: Beilei Xu, Penfield, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 325 days.

(21) Appl. No.: 13/087,850

(22) Filed: Apr. 15, 2011

(65) Prior Publication Data
US 2012/0263357 A1 Oct. 18, 2012

(51) Int. Cl.
*G06K 9/00* (2006.01)
(52) U.S. Cl.
USPC ........... 382/115; 235/380; 382/100; 382/124; 382/128
(58) Field of Classification Search
USPC .................................................. 382/115, 128
See application file for complete search history.

(56) References Cited

U.S. PATENT DOCUMENTS

| 5,291,560 | A  | * | 3/1994  | Daugman | 382/117 |
|-----------|----|---|---------|---------|---------|
| 6,556,858 | B1 | * | 4/2003  | Zeman   |         |
| 7,835,554 | B2 |   | 11/2010 | Rowe    |         |
| 7,899,217 | B2 |   | 3/2011  | Uludag et al. | |
| 8,064,645 | B1 | * | 11/2011 | Sezille  | 382/115 |
| 8,085,992 | B1 | * | 12/2011 | Sahin et al. | 382/115 |
| 8,117,224 | B2 | * | 2/2012  | Galfond | 707/759 |
| 2004/0111030 | A1 | * | 6/2004 | Zeman |  |
| 2005/0281438 | A1 | * | 12/2005 | Zhang et al. | 382/115 |
| 2006/0020212 | A1 |  | 1/2006 | Xu et al. |  |
| 2006/0122515 | A1 | * | 6/2006 | Zeman et al. |  |
| 2008/0298642 | A1 | * | 12/2008 | Meenen | 382/115 |
| 2010/0061598 | A1 | * | 3/2010 | Seo | 382/115 |

OTHER PUBLICATIONS

Jain, A. K.; Prabhakar, S.; Hong, L.; and Pankanti, S., "Filterbank-based Fingerprint Matching", IEEE Trans. on Image Processing, pp. 846-859 (vol. 9, No. 5, May 2000).*
Lee, Chih-Jen; and Wang, Sheng-De, "A Gabor Filter-Based Approach to Fingerprint Recognition", 1999 IEEE Workshop on Signal Processing Systems, pp. 371-378 (Oct. 1999).*
Jain, A. K.; Prabhakar, S.; Hong, L.; and Pankanti, S., "FingerCode: A Filterbank for Fingerprint Representation and Matching", Proc. IEEE Conf. on CVPR, pp. 187-193 (vol. 2, Jun. 23-25, 1999).*

(Continued)

*Primary Examiner* — Jayesh A Patel
*Assistant Examiner* — Iman K Kholdebarin
(74) *Attorney, Agent, or Firm* — Philip E. Blair; Fleit Gibbons Gutman Bongini & Bianco P.L.

(57) ABSTRACT

What is disclosed is a novel system and method for identifying an individual in an IR image involves the following. Intensity values are collected at N wavelengths for each pixel in an IR video-based image. The intensity values are collected using an IR imaging system having an IR detector and an IR Illuminator. The intensity values are then used to identify pixels of human skin in the IR image. If human skin is identified in the IR image then, the human hand is identified in the IR image from the human skin to distinguish the hand from the background. Vein patterns in the hand are then located and extracted. A reference vein pattern is retrieved from a database of known vein patterns for individuals, and a comparison is made to determine a match. If a match is determined, then the individual in the captured IR image can be identified.

24 Claims, 11 Drawing Sheets

(56) References Cited

OTHER PUBLICATIONS

Prabhakar, S., "Fingerprint Classification and Matching Using a Filterbank", Ph.D. Dissertation, Michigan State University (2001).*

Jain, A. K; Prabhakar, S.; and Hong, L., "A Multichannel Approach to Fingerprint Classification", IEEE Transactions on PAMI, pp. 348-359 (vol. 4, Apr. 1999).*

Horton, M.; Meenen, P.; Adhami, R.; and Cox, P., "The Costs and Benefits of Using Complex 2-D Gabor Filters in a Filter-Based Fingerprint Matching System", Proceedings of the Thirty-fourth Southeastern Symposium on System Theory, pp. 171-175 (Mar. 18-19, 2002).*

Wang, et al., "Determining a Total Number of People in an IR Image Obtained Via an IR Imaging System", U.S. Appl. No. 12/967,775, filed Dec. 14, 2010.

Mestha et al., "Method for Classifying a Pixel of a Hyperspectral Image in a Remote Sensing Application", U.S. Appl. No. 13/023,310, filed Feb. 8, 2011.

Wang, et al., "Determining a Number of Objects in an IR Image", U.S. Appl. No. 13/086,006.

Paquit, Vincent C., et al., "3D and Multispectral Imaging for Subcutaneous Veins Detection", Jul. 6, 2009, vol. 17, No. 14, Optics Express 11360.

* cited by examiner

US 8,509,495 B2

SUBCUTANEOUS VEIN PATTERN DETECTION VIA MULTI-SPECTRAL IR IMAGING IN AN IDENTITY VERIFICATION SYSTEM

TECHNICAL FIELD

The present invention is directed to systems and methods for identifying an individual in an IR video or IR image by isolating and extracting skin area, a subcutaneous vein pattern in the skin area from that video or image and comparing that vein pattern to reference patterns of known individuals retrieved from a reference database for identity verification.

BACKGROUND

In many of today's print systems, information regarding various complex device configuration settings required for certain print media attributes is entered manually when an operator desires to run a new print job requiring a new print media. Manual entry for complex settings can be time consuming. It may be difficult to ensure that the configuration settings were entered correctly. An incorrect system setting may not even be noticeable until a large volume of the print job has already been run. Further, it may be difficult to determine whether the existing system settings optimized for a specific set of print media attributes is current or has been updated in a timely manner as more optimal and new configuration settings became available. Furthermore, complex internal components running at very high throughput rates using configuration settings not optimized for a particular media may lead to excessive device component wear, breakdown, and ultimately a system failure. Since such complex print systems are capable of performing different workflows, regular users thereof often need to reprogram the print device to perform their particular workflow each time they approach the device. Users may not be properly trained and may not readily understand the inherent complexities of the print system settings. Further, certain workflow processes may be common to a particular group of users who normally perform the same kinds of document reproduction functions. Other workflows may be tailored to a specific type of user whose job function requires them to configure the print device to perform another entirely different function. In some print/copy job environments, it may further be desirable to prevent certain users from configuring the system to perform particular workflows or prevent them from configuring a device without authorization. Thus it is important to be able to properly configure a complex print system device to a set of device specific system settings which have been optimized for various print media types and various workflow processes tailored to a particular user. A biometric is a unique, measurable characteristic, trait, or physical attribute of a human which is used for recognition or identity verification. Biometric capture is a term that generally refers to the sensing and conveyance of physical attributes of a user including finger prints, palm prints, voice prints, retinal patterns, facial orientations, body temperature, and the like. Biometric devices have been used for user identification in security systems to enable system access. Fingerprints are one example of a biometric which can be readily captured.

What are needed in this art are increasingly sophisticated systems and methods for identifying an individual in an IR video or image captured using IR imaging technology based upon their subcutaneous vein patterns which have been identified and extracted from that image.

INCORPORATED REFERENCES

The following U.S. Patents, U.S. Patent Applications, and Publications are incorporated herein in their entirety by reference.

"Determining A Total Number Of People In An IR Image Obtained Via An IR Imaging System", U.S. patent application Ser. No. 12/967,775, by Wang et al, which discloses a ratio method for classifying pixels in an IR image.

"Determining A Number Of Objects In An IR Image", U.S. patent application Ser. No. 13/086,006, by Wang et al, which discloses a correlation coefficient method and a best fitting reflectance method for classifying pixels in an IR image.

"Method For Classifying A Pixel Of A Hyperspectral Image In A Remote Sensing Application", U.S. patent application Ser. No. 13/023,310, by Mestha et al.

BRIEF SUMMARY

What is disclosed is a novel system and method for identifying an individual in an IR video or IR image by isolating and extracting a subcutaneous vein pattern from that video or image and comparing that vein pattern to vein patterns of known individuals retrieved from a reference database. The present system consists of an IR illuminator, an IR detector, and a reference database of vein patterns of known individuals. Human tissue is identified and isolated in the IR video or image using a method of pixel classification such that the skin area is extracted from the scene. From the identified skin area, the subcutaneous vein patterns beneath the human tissue can be isolated and the vein pattern extracted. Once the subcutaneous vein patterns have been extracted from the IR video or IR image, a database of reference vein patterns which are associated with known individuals is queried and comparisons are made with the captured vein patterns to determine a match such that the person(s) in the IR video or IR image can be identified. The present system and method finds its uses in a wide array of biometric identity verification applications. The present method of subcutaneous vein pattern isolation, extraction, and identity verification has been tested with very positive results using IR images or IR videos of human hands obtained in a cooperative environment.

A system is also disclosed which provides for the automatic configuration of a print system device to a set of device configuration settings tailored to a specific user based upon an identification of the user via the subcutaneous vein patterns of that person's hand. In one embodiment, a networked print system device is placed in communication with an IR imaging system and a plurality of device controllers capable of configuring the print system to a set of device specific settings. A database is also provided for storing, indexing, and retrieving records from a storage medium. A processor capable of executing machine readable instructions is in communication with the IR imaging system, the database, and the device controllers of the print system device. The processor identifies an individual via subcutaneous vein patterns of their hand. Once the user has been identified, the processor instructs the device controllers to configure the print system device to a set of device specific settings. In operation, a user approaches the print system device and places their hand into the field of view of the IR imaging system. The skin area and subcutaneous vein patterns are isolated and extracted from the captured IR video or IR image of the user's hand and the user's identity is confirmed. Thereafter, a database is queried and one or more records containing device specific configuration settings are retrieved which are associated with the identified user. If a matching record is found, it is retrieved and the settings displayed on a user interface display. The user can modify the displayed settings if they desire. Once the displayed device configuration settings have been accepted by the user, the print system device is configured to the device specific settings. If no database records have been found which match the user, then a default set of device configuration settings is displayed for the user. The user can then modify the default device configuration settings to meet to their own print/copy job objectives and requirements. The user can further enter their own set of customized settings for that print system device. These device configuration settings are then associated with the identified user and stored as new records in a database for subsequent retrieval. Thereafter, the user merely has to approach the print system device, place their hand into the field of view of IR imaging device such that identity is confirmed. Device configuration settings which are associated with the user are then automatically displayed for confirmation and acceptance. Thereafter, the print system device can be quickly configured to the user's settings. The present system and method are readily extendible to workflow processes involving transportation safety, airport security, and the like, where the identification of an individual needs to be confirmed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
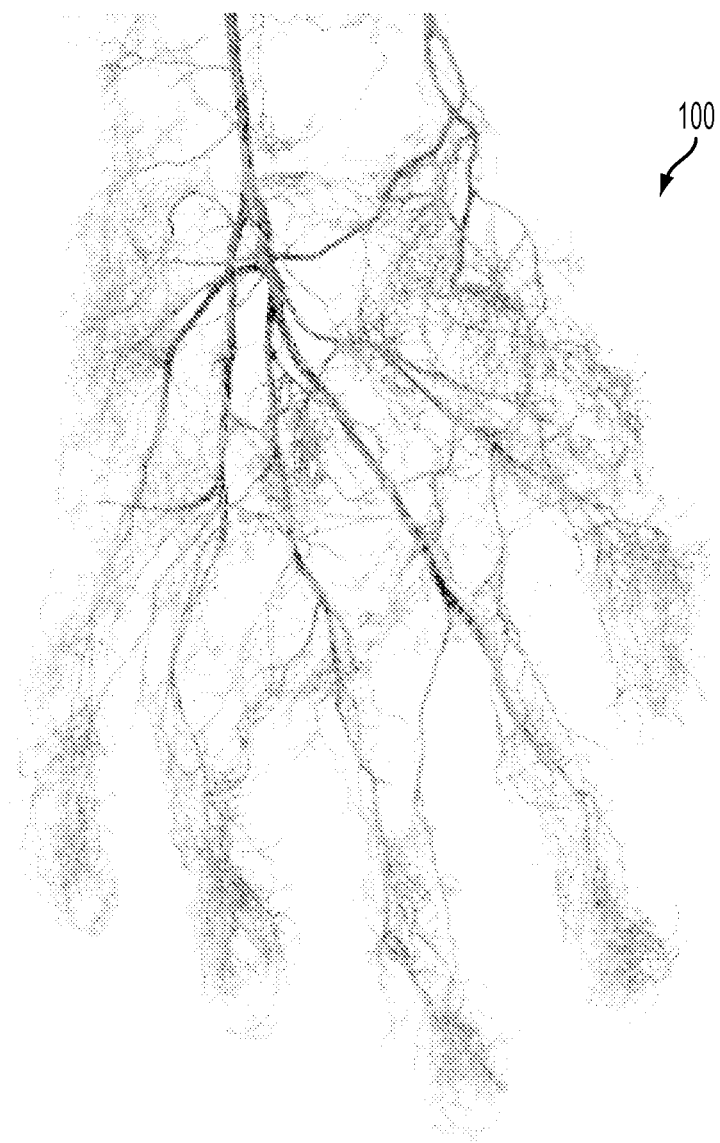
FIG. 1 shows an example pattern of subcutaneous veins in a human hand.

What is disclosed is a novel system and method for identifying an individual in an IR video or IR image by identifying skin area followed by isolating and extracting a subcutaneous vein pattern from that video or image and comparing that vein pattern to vein patterns of known individuals retrieved from a reference database. The present system consists of an IR illuminator, an IR detector, and a reference database of vein patterns of known individuals. Human tissue is identified and isolated in the IR image or IR video using a method of pixel classification such that skin area can be identified from a scene and the subcutaneous vein patterns beneath the human tissue can be isolated and the vein pattern extracted. Once the subcutaneous vein patterns have been extracted from the IR image or IR video, a database of reference vein patterns which are associated with known individuals is queried and comparisons are made with the captured vein patterns to determine a match such that the person(s) in the IR image can be identified.

It should be understood that one of ordinary skill in this art would be readily familiar with many facets of IR imaging systems, IR illumination systems, IR detection systems, pixel processing, pixel intensity values, video processing, and print system devices common to print/copy job environments including device configuration settings common to print system devices. One of ordinary skill would also be knowledgeable about computer science, databases, and software programming systems and methods sufficient to implement the functionality and capabilities described herein in their own system environments without undue experimentation.

NON-LIMITING DEFINITIONS

A "pixel" is the smallest addressable element in an imaging device. Each pixel has its own address. Pixels are normally arranged in a grid. The intensity of each pixel is variable and depends on the characteristics and sensitivity of the sensing device being used to measure that pixel. The resolution for a camera is effectively the size of the pixel. Smaller pixels mean more of them will go into the image, giving it better definition.

An "IR image" is an image obtained from an IR detection device having detected IR light reflected from an illuminated sample. An IR video comprises a plurality of sequential IR images representing progression of the scene over time. A fully-populated IR image consists of pixels with each having an intensity value at each desired spectral band of interest. Infrared (IR) light is electromagnetic radiation with a wavelength between 0.7 and 300 micrometers. It is to be noted that the upper end wavelength for IR range is not precisely set. This equates to a frequency range between 1 and 430 THz. IR wavelengths are longer than the wavelength of visible light, but shorter than the microwave. Bright sunlight provides an irradiance of approximately 1 kilowatt per square meter at sea level. Of this energy, 527 watts is infrared, 445 watts is visible light, and 32 watts is ultraviolet. In active infrared, camera light source illuminates the scene at infrared wavelengths invisible to the human eye. Infrared energy is just one part of the electromagnetic spectrum that encompasses radiation from gamma rays, x-rays, ultra violet, a thin region of visible light, infrared, terahertz waves, microwaves, and radio waves. These are all related and differentiated in the length of their wavelength. Various embodiments hereof utilize the entire lower reflective infrared (LRIR) band (i.e., ≈800-1400 nanometers). LRIR may be detected with a multi-band or hyperspectral imaging (MBI) device sensitive to that frequency band and provide images that resemble a black and white picture. The upper reflective infrared (URIR) band (i.e., ≈1400-2200 nanometers) sensed image is not like LRIR sensed images in that human flesh does not reflect IR in the same manner as inanimate objects. Since the lower and upper IR bands are reflective, the scene may need a source of illumination. Such illumination need not be visible and so will not be a distraction to human beings. In the daytime, the LRIR and URIR illumination may be unnecessary because sufficient IR illumination may be provided by ordinary sunlight.

An "IR illuminator" is a light source that provides illumination in the IR wavelength bands. Light levels may be controlled by varying the drive currents. For example, the optical output of LEDs varies linearly with current. LED arrays capable of IR illumination both in time-sequential fashion or simultaneously, are well known. One example IR Illuminator is shown and discussed with respect to FIG. 2.

An "IR detector" receives reflected IR light emitted by an IR illuminator and generates an output signal in response. One example IR detector is shown and discussed with respect to FIG. 3.

An "IR imaging system" is a system comprising an IR Illuminator and an IR Detector and is designed to capture IR light reflected from a target object, separate it into its component wavelengths, and output an IR video or IR image of the target. One example IR imaging system for capturing IR images or IR video of a human hand for subcutaneous vein pattern detection and recognition is shown at 406 in FIG. 4.

A "non-cooperative environment" is one in which the IR image or IR video of a person's hand is obtained without that person's conscious cooperation. One example wherein an IR video or IR image of a person's hand is captured in a non-cooperative environment would be at an airport or a train station, for example, where the IR imaging system is hidden and photos are taken of persons as they walk through a detector.

A "cooperative environment", in contrast to a non-cooperative environment, is one in which the subject individual voluntarily participates in the capture of the image of their hand by, for instance, voluntarily placing their hand onto an IR video or IR image capture device such that the vein patterns in their hand can be used for identification purposes.

A "device configuration setting" is any adjustable system or subsystem setting applicable to a digital document reproduction device. The term also is intended to refer to workflows which the device can be programmed to perform. Example device configuration settings include: settings for sheet steering for registration control where media thickness and weight and stock size are important parameters; fuser temperatures which are generally based on media type, thickness, and weight, and are selected for optimal quality, throughput, and performance; and settings which are discretely set for a given paper stock and are not derived from the selected media attributes. Such settings would be, for example, ATA tip velocity control, transfer dicor control, and pre-transfer dicor control. Device configuration settings includes subsystem critical parameter settings such as voltage levels provided as part of the paper stock description obtained from the user selected print media attributes. In some cases, a separate parameter setting is provided for side 1 and side 2 of the paper stock or media type. Various print media (i.e. paper, forms, cards, transparencies, etc.) can be defined by a set of print media attributes which includes media type, media size, media color, media weight, etc. A media type includes plain, lightweight, recycled, Mylar, etc. A media size includes letter, legal, executive, A4, A5, A6, etc. A media color can be any color such as blue, green, etc. A media weight includes parameter values such as: lb, gsm, etc. As an example, A4 paper has the following media attributes: type—plain, size—21.0×29.7, color—white, weight—90. Print media attributes encompasses a set of characteristics by which differing types of print media can be differentiated in a print/copy job environment. Device configuration settings are stored in a memory or storage device addressable by a processor of a computer system. Some device configuration settings may be locked-out or restricted from being selected, modified, or changed by someone other than a certified technician.

Figure 4:
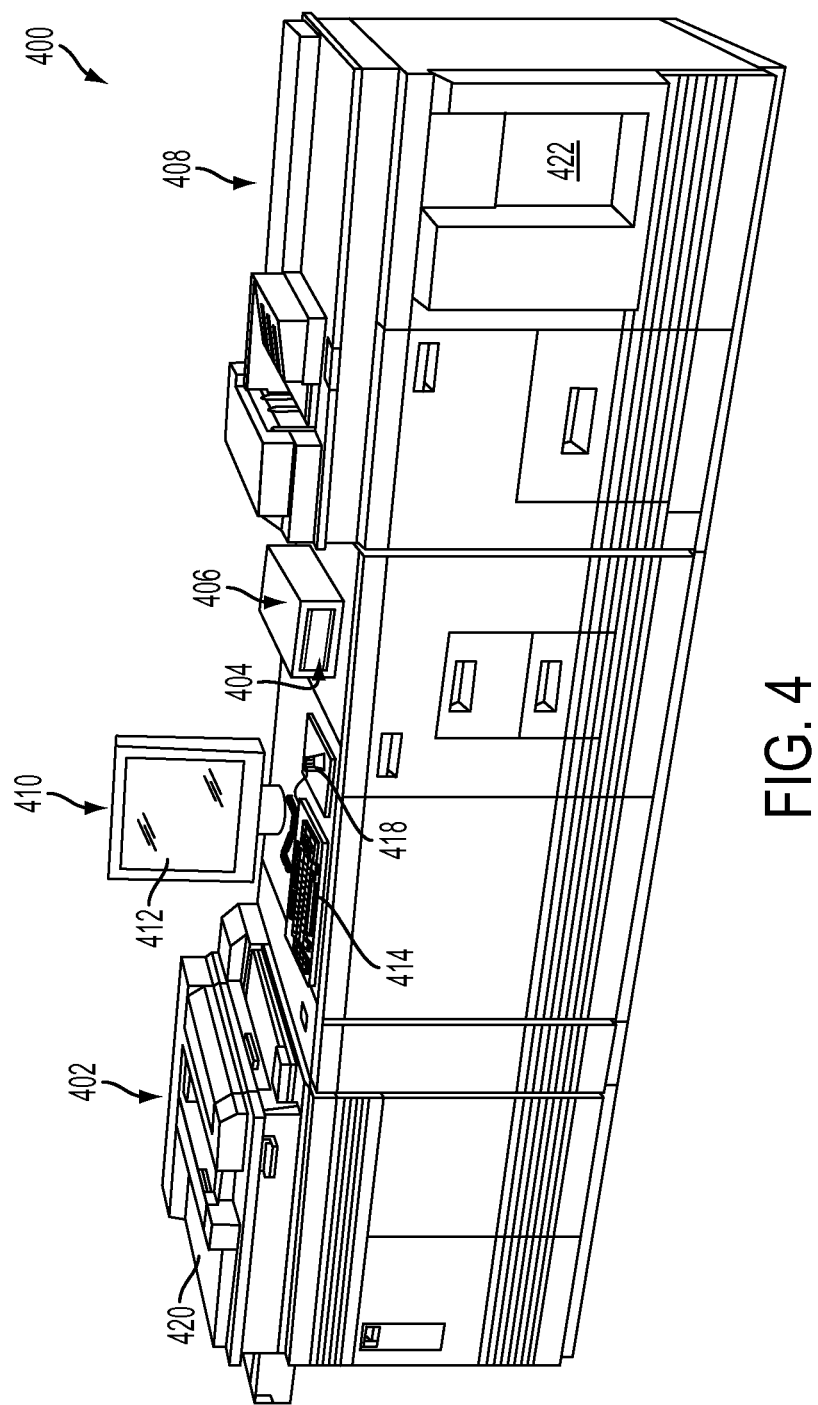
FIG. 4 illustrates one document reproduction device which incorporates an example IR imaging system which captures one or more IR images or IR videos of a human hand for subcutaneous vein pattern detection and recognition such that the print system device can be automatically configured to a set of device specific settings.

A "document reproduction device" or "complex print system device" is any device or system having an image forming apparatus for producing an output of a digital image of a document. One example complex print system device is shown in FIG. 4. The set of complex print system devices includes monochrome or color digital document reproduction architectures, document scanning systems, a wide variety of printers/copiers, digital printing presses, and other multi-function document reproduction systems. Such systems generally include a display device such as a CRT or touch screen along with one or more user interfaces such as a keyboard, mouse, keypad, touchpad, and the like, for entering data and configuring device-specific settings to optimize image quality and performance. Such complex print system devices generally include a user interface such as a CRT or touch screen display and generally further include any number of data entry interfaces such as a keyboard, mouse, keypad, and the like. Such systems have complex paper transport mechanism, collators, sorters, staplers, to name a few, each controlled by device specific controllers many of which are configurable to one or more device specific settings. Document reproduction devices generally include a plurality of paper trays capable of retaining a variety of print media/stock.

Example Subcutaneaous Vein Pattern of a Human Hand

A subcutaneous vein pattern is a unique pattern of veins associated with a particular part of an individual's body. Such a vein pattern is best described by way of the example human hand 100 of FIG. 1. The teachings hereof are directed towards identifying an individual through a subcutaneous vein pattern captured by an IR imaging system and by cross-referencing the vein patterns extracted from the IR video or IR image with subcutaneous vein patterns of known individuals retrieved from a storage device such as, for instance, a memory, hard drive, or a database. It should be appreciated that, although the embodiments hereof are discussed with respect to the subcutaneous vein patterns of a human hand for identity verification purposes, it should be appreciated that the teachings hereof are equally applicable to identifying a particular individual based upon the subcutaneous vein patterns of other portions of their body such as, for instance, subcutaneous vein patterns of their legs, their face, back, chest, arms, feet, neck, eyeball, scalp, ear, a full frontal view, a full dorsal view, to name a few. Such embodiments are intended to fall within the scope of the appended claims.

Example IR Illumination System

Figure 3:
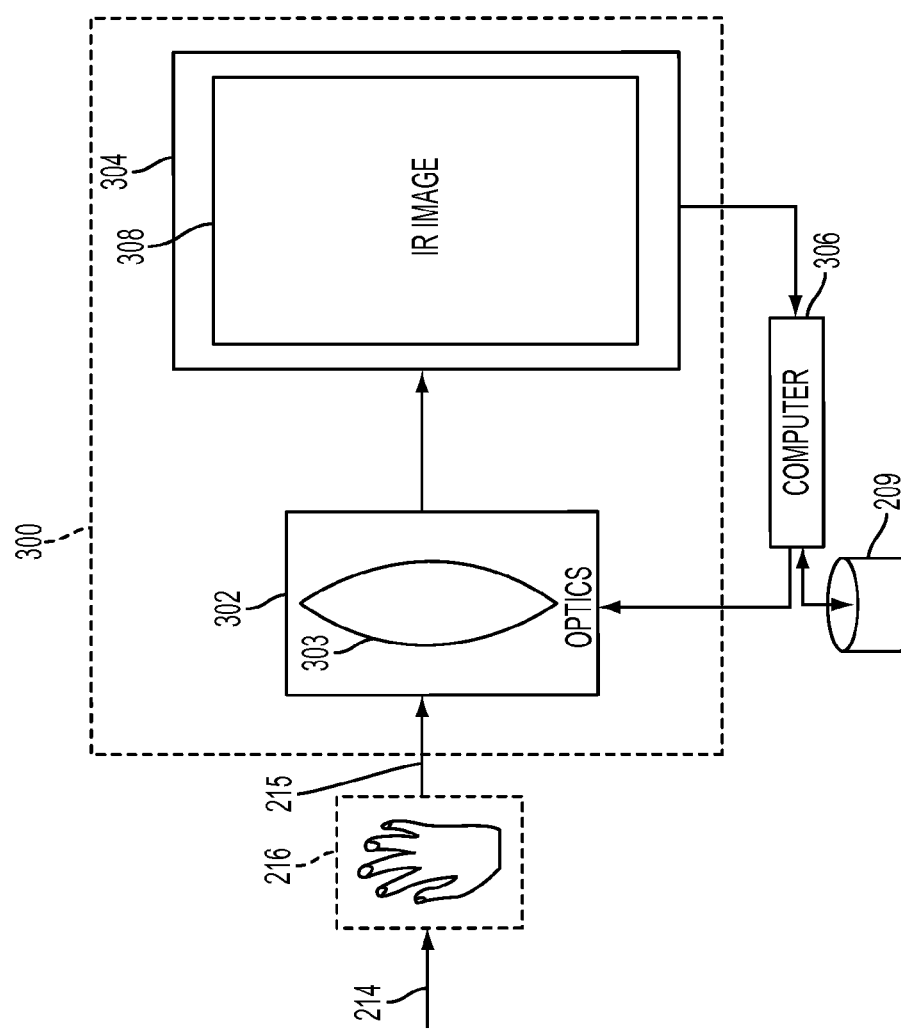
FIG. 3 illustrates one embodiment of an example IR detector for capturing an IR image of a human hand for subcutaneous vein pattern detection and recognition in accordance with the teachings hereof.

Reference is now being made to FIG. 3 which illustrates one embodiment of an example IR illuminator for focusing a beam if IR light at a desired wavelength onto a target human hand for subcutaneous vein pattern detection and recognition.

The IR illuminator 200 is shown comprising an IR light source array 202 having a plurality of IR light sources each emitting a narrow band of IR radiation at a respective peak wavelength (shown as $\lambda_1, \ldots, \lambda_n$). Source array 202 comprises an array of light emitting diodes (LEDs). Each diode is selected to emit IR radiation at a particular wavelength band and defines a source in the array for that wavelength band. Controller 208 is coupled to IR source array 202 and controls the input current to each illuminator and thereby, the intensity output of each. Sensing optics 204 has one or more optics 203 which combine the wavelengths to produce IR illumination beam 206. Sensor 210 samples the radiation emitted from the IR light source array and provides feedback to controller 208. Focusing Optics 212 receives beam 206 and focuses output beam 214 onto human hand 216 and causes light 215 to be reflected therefrom. Optics 212 includes a plurality of lens of varying focal lengths positioned in the beam path to focus the beam. Controller 208 is also coupled to optics 212 to effectuate changes in output beam 214 due to hand size, distance to the hand, hand orientation, hand movement, hand coverings, to name a few constraints. Controller 208 is further in communication with storage device 209 to store/retrieve calibration information, intensity levels, and the like, including data and machine readable program instructions. Controller 208 may comprise a computer system such as a desktop, server, mainframe, and the like. Controller 208 may be placed in wired or wireless communication with such a computing device over a network (not shown). Such a network may be a local area network (LAN) or the Internet. It should be appreciated that, in a cooperative environment, any of the components of illumination system 200 may be placed in communication with such a computing system to further facilitate the intended purposes hereof. In an non-cooperative environment, the IR imaging will only aim at a general area, e.g. around the front of a printing controller, where a user might present.

Any of the optics described above with respect to FIG. 2, can be replaced with an optical system having optical power and may further include mirrors. Such an optical system may include multiple components each having optical power, e.g., it may be doublet or a triple lens. In the limit that such optical system defines a unique focal length F, the source array and grating would be positioned in the front and back focal planes of the optics. As a result, the optical system images the grating at infinity with respect to each element of the light source array, and thus each source element sees the same region of the grating. The light from each element would be coextensive on that region. The grating can then produce output radiation whose spectral content is substantially uniform across its transverse profile by compensating for the dispersion associated with lateral position of the different wavelength band sources. This allows the spectral content of output beam 214 to be substantially uniform across its transverse profile. In practice, it may be difficult to precisely define a desired focal length for the optical system because of aberrations (e.g., field curvature, axial chromatic, lateral chromatic, distortion, coma, and the like, which may cause the optics to focus rays to slightly different positions according to their wavelength or their lateral positioning. In addition, the relative positions of the optical system, the source array, and the grating, are selected according to the more general condition that the optical system images the grating at infinity with respect to each source element of the light source array, at least for paraxial rays that emerge from each source. For a ray propagating at an angle $\theta$ to the optical axis, a paraxial ray has $\sin(\theta) \approx \theta$. This infinity condition can be achieved by positioning each source element at a nominal back focal plane of the optical system to within the depth of field of the optical system, and positioning the grating at nominal front focal plane of the optical system to within the depth of field of the optical system. The depth of field (DOV) is related to the numerical aperture (NA) of the optical system according to: $DOV = \lambda/NA^2$, where $\lambda$ is the wavelength of the light from the source element. The optics may be designed with components to provide multiple degrees of freedom to compensate for various optical aberrations. Although additional components in the optical system provide additional degrees of freedom for reducing aberrations, each additional component also adds cost and complexity to the optical system.

Example IR Detection System

Reference is now being made to FIG. 3 which illustrates one embodiment of an example IR detector for capturing an IR image of a human hand for subcutaneous vein pattern detection and recognition in accordance with the teachings hereof.

Figure 2:
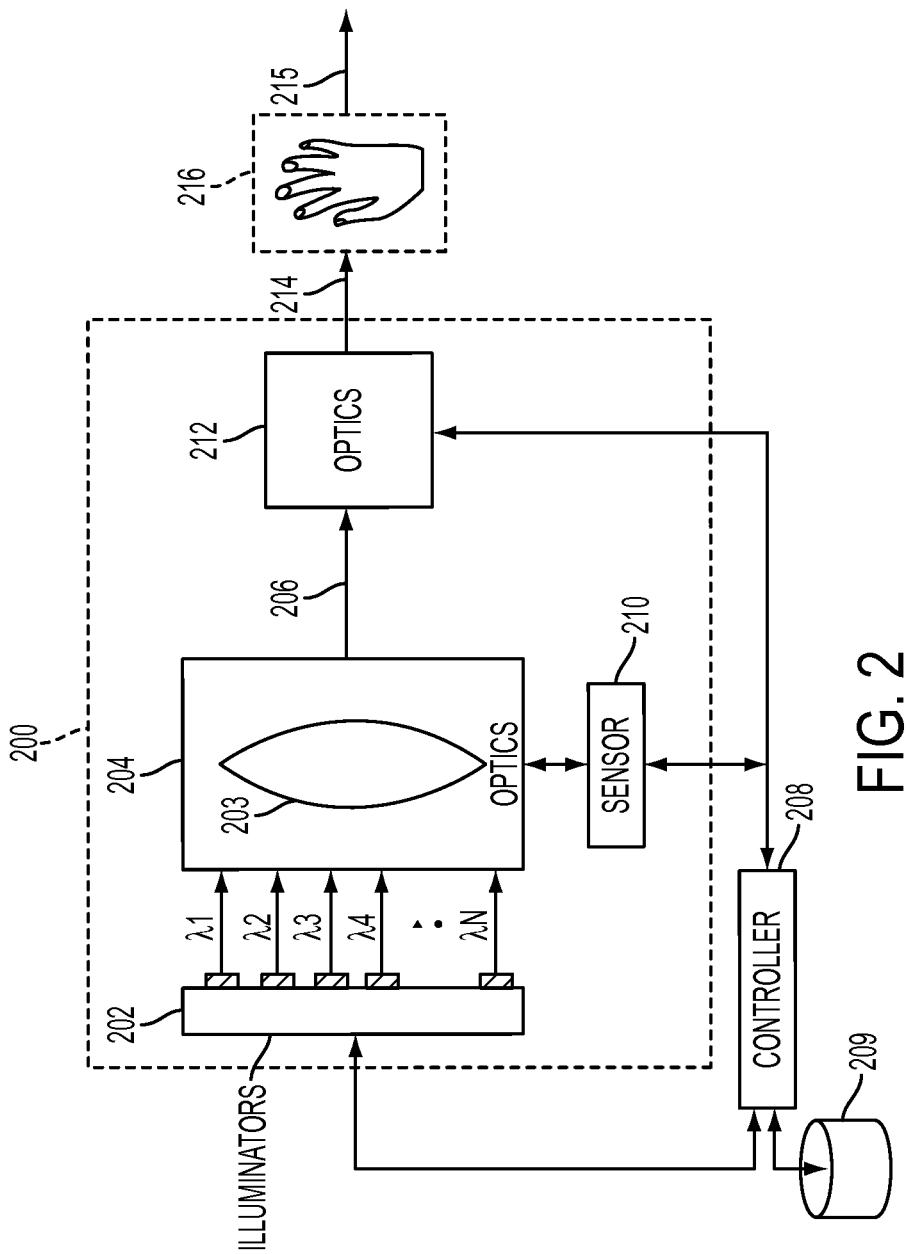
FIG. 2 illustrates one embodiment of an example IR illuminator for focusing a beam of IR light at one or more desired wavelengths onto a target human hand for subcutaneous vein pattern detection and recognition in accordance herewith.

In FIG. 3, example human hand 216 reflects IR light beam 214 emitted by optics 212 of FIG. 2 such that at least a portion of the reflected light 215 is received by optics 302. Optics 302 has one or more lens 303 which focus the received light 215 onto sensor 304 such that the received light can be spatially resolved to obtain IR image 308. Optics 302 may also include one or more band pass filters that only allow light in a narrow band of wavelength to pass through. The filters may also be sequentially changed to get N wavelength bands of the same image 308. Sensor 304 sends the pixel intensity values of IR image to computer 306 for processing and storage 309. In one embodiment, detector 308 is a multi-spectral IR detection device whose spectral content is to be selectable. Suitable optics for source optics 302 and detector optics 304 include those commonly found in the art. Detector 304 independently records light intensity values at multiple pixel locations along a multi-dimensional grid. Suitable sensors include charge-coupled device (CCD) detectors, complementary metal oxide semiconductors (CMOS) detectors, charge-injection device (CID) detectors, vidicon detectors, reticon detectors, image-intensifier tube detectors, pixelated photomultiplier tube (PMT) detectors, Indium Gallium Arsenide (InGaAs), Mercury Cadmium Telluride (MCT), and Microbolometer. It is to be noted that the silicon based detectors are limited to below 1100 nm. Systems with hybrid detectors (i.e., combinations of silicon based and non-silicon based) are not out-of-reach.

Computer 306 is in communication with optics 302 to control the lens thereof, and with detector 304 to control the sensitivity thereof. Computer 306 receives the sensitivity values associated with each pixel of IR image 308 and processes the received sensitivities in accordance with the teachings hereof to identify the vein patterns in the captured image and further identify the person whose hand is in the image. Computer 306 further classifies pixels and performs calculations and comparisons in a manner more fully described herein. Computer workstation 306 further includes a keyboard, monitor, printer, etc. (not shown) as is necessary to effectuate the control of system 200 and system 300 via communication pathways (not shown). Embodiments of networked computer workstations are shown and discussed with respect to FIGS. 9 and 10.

Pixel Intensity Values

In accordance with various embodiments hereof, a total of N pixel intensity values are collected at N wavelength bands using an IR imaging system comprising an IR illuminator and an IR detector, as shown by way of example with respect to FIGS. 2 and 3. It should be appreciated that calculations for intensity values depends on the configuration of the IR imaging system employed. Next is described four variations of intensity value formulations. It is assumed that the IR attenuation in the air and the integration time to be the same for all bands. If not, these factors need to be adjusted accordingly.

If the IR detection device comprises a single IR detector then the pixel intensity value is given by:

$$I_c(j) = \alpha \int_{\lambda 1}^{\lambda 2} I_s(\lambda)[T_G^2(\lambda)R_o(\lambda)+\eta R_G(\lambda)]T_L(\lambda)D(\lambda)d\lambda + I_b,$$

where j=1, ..., N, such that j is the $j^{th}$ IR band from the illuminator that is illuminating, $\alpha$ is a constant that depends on an angle and distance from the illumination source, an attenuation of an IR wave in the air, and an integration time of the detecting device, $I_b$ is an intensity from a background light source such as that from the IR component of sunlight, $I_s(\lambda)$ is a calculated correspondence of a measured intensity, $I_m$, such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $T_L(\lambda)$ is a transmittance of the filter, $R_G(\lambda)$ and $T_G(\lambda)$ are a reflectance and a transmittance of glass or other types of material between the target object and the illumination source and camera, otherwise $R_G(\lambda)=0$ and $T_G(\lambda)=1$, constant $\eta$ is a measure of the percentage of light from the IR illuminator reflected from glass and received by the detector, otherwise $\eta=0$, and where $T_L(\lambda)=1$, and $D(\lambda)$ is a responsivity of the detection device.

If the IR detection device is a single IR detector having N band pass filters (N≧1), and the IR Illuminator is a single IR illuminator covering a wavelength range of those filters, then the pixel intensity value is given by:

$$I_c(i) = \alpha \int_{\lambda 1}^{\lambda 2} I_s(\lambda)[T_G^2(\lambda)R_o(\lambda)+\eta R_G(\lambda)]T_L^i(\lambda)D(\lambda)d\lambda + I_b,$$

where i=1, ..., N, such that i is the $i^{th}$ IR band pass filter, $\alpha$ is a constant that depends on an angle and distance from the illumination source, an attenuation of an IR wave in the air, and an integration time of the detecting device, $I_b$ is a background intensity, $I_s(\lambda)$ is a calculated correspondence of a measured intensity, $I_m$, such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from the illuminator reflected from glass and received by the detector, otherwise $\eta=0$, $T_L^i(\lambda)$ is a transmittance of the $i^{th}$ filter, and $D(\lambda)$ is a responsivity of the detecting device.

If the IR detection device has N detectors (N≧1) having a total of I filters (I≧1), and the IR Illuminator has J illuminators (J≧1) such that the combination of I filters and J illuminators covers a desired wavelength range then the pixel intensity value is given by:

$$I_c(i) = \alpha \int_{\lambda 1}^{\lambda 2} I_s^j(\lambda)[T_G^2(\lambda)R_o(\lambda)+\eta R_G(\lambda)]T_L(\lambda)D(\lambda)d\lambda + I_b,$$

where i=1, ..., I, such that i is the $i^{th}$ IR band from the $J^{th}$ illuminator that is illuminating, $\alpha$ is a constant that depends on an angle and distance from the illumination source, an attenuation of an IR wave in the air, and an integration time of the detecting device, $I_b$ is an intensity from a background light source such as that from the IR component of sunlight, $I_s^j(\lambda)$ is a calculated correspondence of a measured intensity, $I_m^j$, from the $j^{th}$ illuminator such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $T_L(\lambda)$ is a transmittance of the filter, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from the IR illuminator reflected from glass and received by the detector, otherwise $\eta=0$, and where $T_L(\lambda)=1$, and $D(\lambda)$ is a responsivity of the detection device.

If the IR detection device has N narrow band detection devices (N≧1) having a total of I filters (I≧1) and the IR Illuminator has a total of J illuminators (J≧1), then the pixel intensity value is given by:

$$I_c(i) = \alpha \int_{\lambda 1}^{\lambda 2} I_s(\lambda)[T_G^2(\lambda)R_o(\lambda)+\eta R_G(\lambda)]T_L(\lambda)D^i(\lambda)d\lambda + I_b,$$

where i=1, ..., I, such that i is the $i^{th}$ IR band from the $J^{th}$ illuminator that is illuminating, $\alpha$ is a constant that depends on an angle and distance from the illumination source, an attenuation of an IR wave in the air, and an integration time of the detecting device, $I_b$ is an intensity from a background light source such as that from the IR component of sunlight, $I_s(\lambda)$ is a calculated correspondence of a measured intensity, $I_m$, such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $T_L(\lambda)$ is a transmittance of the filter, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from the IR illuminator reflected from glass and received by the detector, otherwise $\eta=0$, and $T_L(\lambda)=1$, and $D^i(\lambda)$ is a responsivity of the detection device at the $i^{th}$ band.

Example Document Reproduction System

Reference is now being made to FIG. 4 which illustrates an example document reproduction system which incorporates an IR imaging system 406 which captures one or more IR images (or IR video) of a human hand for subcutaneous vein pattern detection and identity recognition such that the print system device can be configured to a set of device configuration settings for the user's print/copy job requirements.

Example print system device 400 is shown generally comprising an input sub-system 402 which includes a document scanner 420 for receiving a digital image of a hardcopy print. Document processing sub-system 406 includes device controllers which control the performance of many processing functions. The document processing system comprises a special purpose computer systems which have processors capable of executing machine readable instructions, memory and a storage device, such as a disk drive, for storing programs and data. Printer engine sub-system 408 includes processors and controllers for regulating the application of inks or toners onto a print media as well as to control various media moving through the print system for proper registration, and the like. Digital document reproduction device 400 includes discharge area 422 where finished prints are deposited for retrieval. A document processing workstation, shown generally at 410, incorporates a display 412, keyboard 414, and mouse 418, which collectively comprise a graphical user display for enabling the device operator or user thereof to enter or select one or more displayed menu options and for accepting or modifying a set of device specific settings. Alternatively, a touch screen display is utilized which enables the user to select displayed menu options by physically touching the surface of the display screen. By using the graphical user interface of workstation 410, the user can configure device specific parameters, initiate scan operations, select print media attributes, and initiate one or more document processing workflows. It should be understood that workstation 410 necessarily includes machine executable instructions for communicating with various internal device controllers which, in turn, configure the print system device to the selected settings desired for the intended workflow. Various components of system 400, individually or collectively, comprise a special purpose computer system which has a processor capable of executing machine readable program instructions, memory and a storage device for storing programs and retrieving data records.

One of ordinary skill would appreciate that various internal components of a document reproduction device such as print system device 400 are controlled by one or more device controllers and are changeable based upon the selected print media attributes chosen for a particular print/copy job. Such controllers configure internal pathways to, for example, transport a certain type of print media having a particular size or orientation. Other internal components can be configured by device controllers to adjust the amount of toner to be applied to a print media surface. Device controllers instruct other components to change, for example, the temperature at which a toner is fused to a surface of a print media. Sophisticated print systems such as system 400 have many such internal components capable of being configured by device controllers to one or more device specific configuration settings. Such complex devices require operator training such that the device can be properly configured to maintain throughput and a quality print result. Thus, it should be appreciated that, in such devices, the operator is trained on how to change various system configuration settings through the graphical user interface of a workstation to ensure optimal device performance, throughput, and print/copy job quality for a set of print media attributes desired for a particular workflow.

Also shown incorporated into the print system of FIG. 4 is example IR image capture system 406 which is affixed, mounted, or otherwise integrated with system 400 near workstation 410 for convenient operator/user access. IR hand scanner 406 receives a user's left or right hand via slot 404 and collects pixel intensity values therefrom. In one embodiment, IR imaging system 406 incorporates the embodiments of FIGS. 2 and 3. Signals captures by system 406 are processed by a special purpose computer of workstation 410 and the results are displayed on the display thereof. Such results include the captured IR video or image, the extracted subcutaneous vein patterns, the identity of the user upon completion of a match of the extracted subcutaneous vein patterns, and the retrieved one or more records containing device configuration settings associated with the identified user. A special purpose computer system is associated with IR hand scanner 406. Through an implementation of various hardware and software embodiments, the special purpose computer is able to process the collected intensity values such that the user can be identified. One or more portions of the capture IR video or an IR image and/or the subcutaneous vein patterns extracted therefrom, may be communicated to a remote device such as a computer workstation or special purposes system over a network (not shown) for additional processing.

Workstation 410 may be configured to receive signals of the captures IR image of the user's hand from IR imaging system 406, classify the pixels in the IR image such that the subcutaneous vein patterns beneath the human tissue of the hand can be identified and extracted from the image; display results to the user on the display 412, retrieve user-specific or user-specified device configuration settings for display and subsequent configuration and/or retrieve default device configuration settings if the user cannot be identified. Both the workstation 410 and IR image system 406 can further execute software designed to perform these and other functions described herein, such as pixel classification accoding, comparisons, determine mathematical relationships, perform computations, and the like. It should also be appreciated that workstation 410 includes machine executable instructions for displaying the print media attributes and for communicating with various internal device controllers which, in turn, configure the print system device to the user-selected settings desired for the intended workflow.

Example Flow Diagram

Although this embodiment is discussed with respect to a cooperative embodiment wherein a user voluntarily places their hand into a slot of an IR imaging system such that their identity can be ascertained via the subcutaneous vein patterns of either their left or right hand and a print system configured according to a set of device configuration settings specific for the identified user, it should be fully appreciated that the teachings hereof are intended to find their uses in a wide variety of systems and applications where identification of an individual is effectuated using IR images (or IR video) obtained in a non-cooperative environment. In a non-cooperative environment, an IR image or IR video of some or all of an individual is captured or otherwise obtained without their conscious cooperation such as, for example, an airport, bus depot, train station, customs office, port of entry, and the like, so that the identity of that person can be determined. For instance, in the embodiment discussed with respect to the system of FIG. 4, in a non-cooperative environment, an IR video or IR image of the user is captured without them having to place their hand into the IR imaging system 406. In such an embodiment, an IR video capture system is activated by, for instance, a motion sensor having been activated upon the user having approached the print system device. The motion sensor activates the IR image/video capture system. The captured IR video or images are processed such that a hand or face or other human tissue portion is identified. Subcutaneous vein patterns are extracted from the IR image or IR video. The system then cross-references a database of known reference vein patterns to ascertain the identity of the user. If the system doesn't recognize the user, the system can prompt the user with a default setting. If the system recognizes the user, a preferred setting is shown on the control panel. For a new user, after the user enters their own preferred setting, the system prompt the user if they'd like to store the information using their personal identification.

Figure 5:
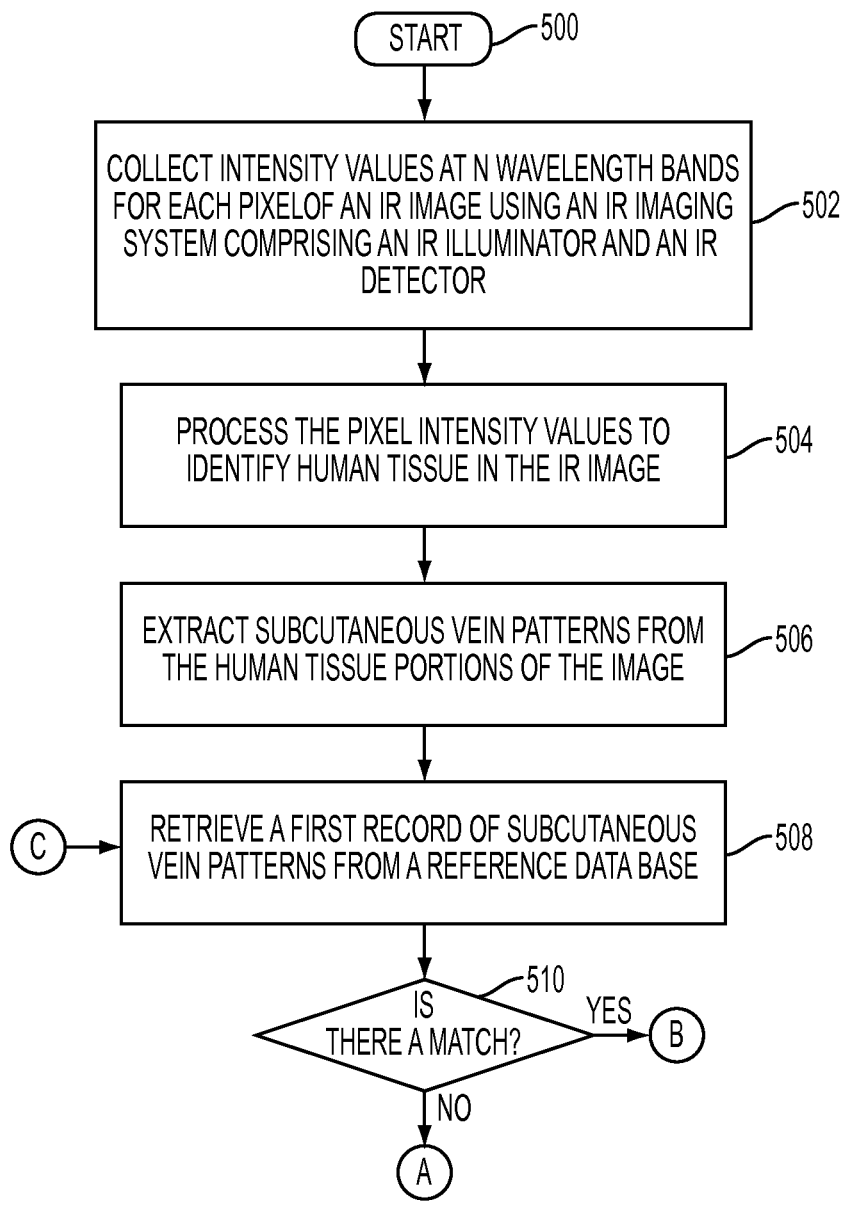
FIG. 5 is a flow diagram of one example embodiment of the present method for identifying an individual in a IR image or IR video via subcutaneous vein pattern detection and recognition such that a print system device such as system of FIG. 4 can be automatically configured to a set of user-specified device configuration settings.

Reference is now being made to the flow diagram of FIG. 5 which illustrates one example embodiment of the present method for identifying an individual in a IR image via subcutaneous vein pattern detection and recognition such that a print system device such as system 400 of FIG. 4 can be automatically configured to a set of user-specified device configuration settings. Flow processing starts at 500 and immediately proceeds to step 502.

At step 502, intensity values at N wavelength bands are collected for each pixel in a captured IR image or IR video. One example cooperative environment which uses an IR imaging system to capture an IR image or IR video of a human hand for user identification and subsequent device configuration is shown in FIG. 4. In the example embodiment of FIG. 4, the intensity values are collected by the user placing their hand into slot 404 of IR image system 406 which utilizes the IR illumination system of FIG. 2 and the IR detection system of FIG. 3.

At step 504, the collected intensity values are processed such that human tissue can be identified from other portions of the IR image such as, for example, clothing, jewelry, background objects, and the like. In one embodiment, pixels in the IR image are identified as being human tissue (i.e., skin and veins) by a pixel classification technique. Embodiments for classifying pixels collected by an IR image system utilizing either a ratio method, a correlation coefficient method, or a best fitting reflectance method are disclosed in the above-incorporated references to Wang et al. Performing a classification of the pixels enables skin and veins to be identified within the IR image from surrounding material.

At step 506, subcutaneous vein patterns are extracted from the human tissue portion of the IR image. The vein patterns are extracted by identifying from "human tissue" pixels in the IR image which have been classified as vein or blood. Once pixels of human vein tissue have been identified in the IR image, these pixels can be isolated from the remaining pixels in the image. The isolated pixels forming an extracted vein pattern are shown by way of example in the IR image of FIG. 1. It is well established that that the near infrared light (NIR) absorption rate of hemoglobin is high when human skin is irradiated by NIR, a larger amount of NIR is absorbed by the skin beneath which a vein exists than by the skin beneath which a vein does not exist. Therefore, the area of skin beneath which a vein exists appears darker than an area of the skin beneath which a vein does not exist. The extracted vein patterns can be stored or communicated to a remote device over a network.

In the embodiment of FIG. 4 wherein an IR image of the user's hand is used for identification and device configuration, all or a portion of the subcutaneous vein patterns of the user's hand may be assigned alphanumeric codes to indicate the region of the hand (or body) which that vein pattern belongs. In this example, extracted subcutaneous vein patterns of the left hand are assigned the letter "L" and extracted subcutaneous vein patterns of the right hand are assigned the letter "R". These portions can then be individually oriented, rotated, sequenced, and searched in a parallel manner. Partitioning the vein patterns into regions or areas and assigning alphanumeric codes to the various portions thereof is but one embodiment and is not intended to be viewed as limiting. Such an embodiment is intended to facilitate a search and cross-referencing of vein patterns. In systems which employ sufficient computational resources, a vein pattern of an entire frontal view of an individual, for example, could be compared to a reference vein pattern of entire frontal views of known individuals which have been stored in a database for subsequent retrieval and comparison.

At step 508, a first record of a reference subcutaneous vein pattern is retrieved from a database containing records of vein patterns of known individuals. One example database system in communication with a networked computer workstation is shown and discussed with respect to FIG. 9. Such records can be obtained in a variety of ways either cooperatively or non-cooperatively. Such a comparison can be performed on a pixel-by-pixel basis or by features extracted from the vein pattern such as distance among branching points). Methods for comparing two images are well established. If the vein patterns are partitioned according to a body portion and assigned alphanumeric codes for identification and comparison purposes, then only a corresponding portion of a reference vein pattern is required to be retrieved for initial comparison purposes. For example, in the embodiment where the user cooperatively inserts their right hand into an IR imaging system (at 409 in FIG. 4) and the extracted subcutaneous vein patterns in that right hand, for comparison purpose, only the back hand portion can be retrieved from stored subcutaneous vein patterns of reference individuals. If there is not a match of the subcutaneous vein pattern of the back portion of the right hand then there is no need to retrieve the remaining vein patterns (each finger) and perform those comparisons. On the other hand, if there is a match of the subcutaneous vein patterns of the back portion of the right hand then one or more of the vein patterns associated with the individual fingers can be retrieved for comparison purposes in an effort to confirm the initial comparison results. Thus, partitioning the vein pattern into portions or regions associated with the body areas wherein these vein patterns reside can facilitate a search and comparison process.

At step 510, a determination is made whether the retrieved reference subcutaneous vein pattern matches the user's extracted subcutaneous vein patterns. If there is not a match then processing continues with respect to node A of FIG. 6. If there is a match then the user's identity is confirmed and processing continues with respect to node B of FIG. 8.

Figure 6:
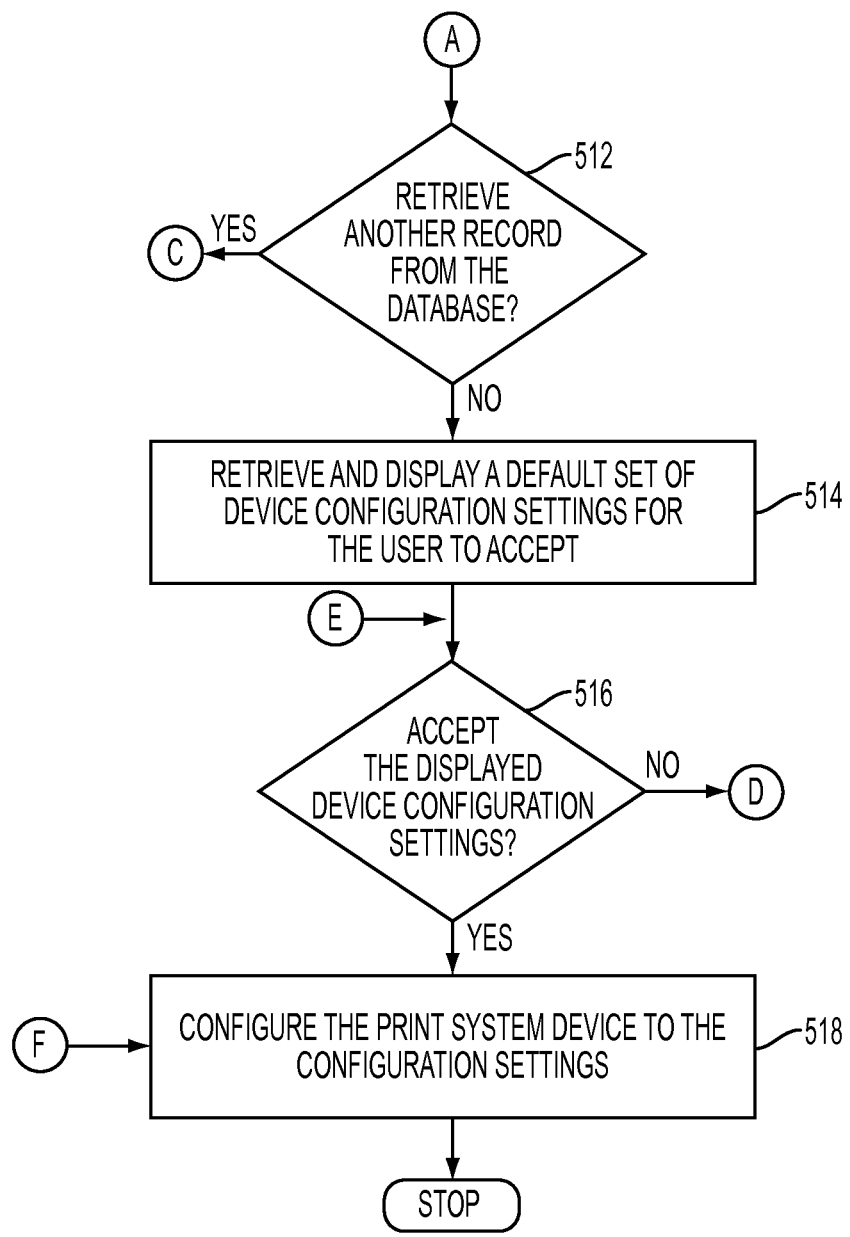
FIG. 6 is a continuation of the flow diagram of FIG. 5 with flow processing continuing with respect to node A.

Reference is now being made to the flow diagram of FIG. 6 which is a continuation of the flow diagram of FIG. 5 with flow processing continuing with respect to Node A.

If there is not a match of vein patterns (step 510 of FIG. 5) then, at step 512, a determination is made whether another record of reference subcutaneous vein patterns is to be retrieved from the database for comparison with the user's extracted vein pattern. If so then processing continues with respect to node C wherein, at step 608, a next record containing a next subcutaneous vein pattern (or portion thereof) is retrieved from the database. This next vein pattern is then compared to the user's vein pattern. The process repeats in such a manner until either a matching reference subcutaneous vein pattern has been found and the user identified, or until no more records of reference vein patterns are to be retrieved from the database. If no more records are to be retrieved then the identity of the user is unknown and processing continues with respect to 514.

At step 514, a default set of device configuration settings are retrieved and displayed for the user's review and acceptance.

At step 516, a determination is made whether to accept the default set of device configuration settings. If the user accepts the displayed default device configuration settings then processing continues with respect to step 518 wherein the print system device is configured to these settings. Thereafter, in this embodiment, further processing stops since the device is now configured to the default settings. If the user does not accept the displayed default device configuration settings then processing continues with respect to node D of FIG. 7.

Figure 7:
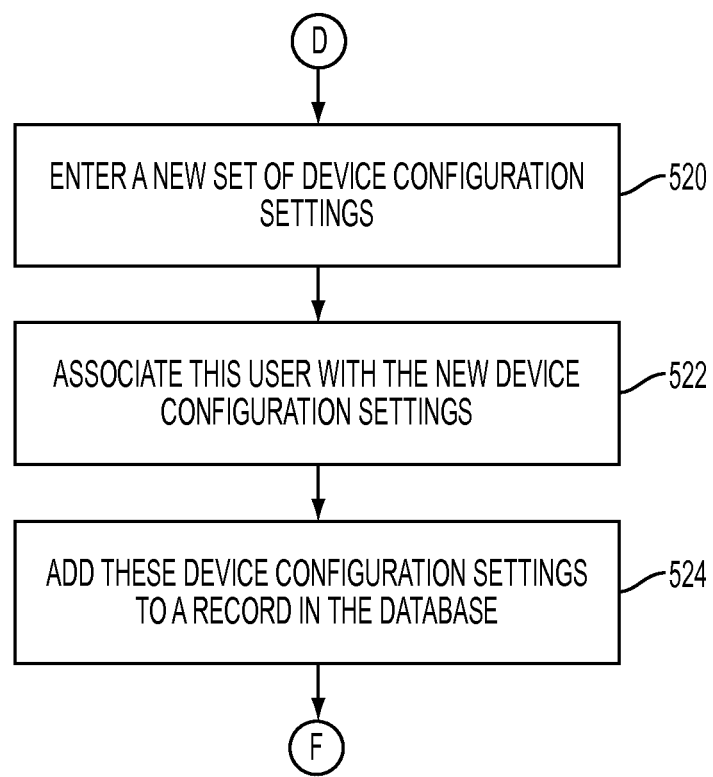
FIG. 7 is a continuation of the flow diagram of FIG. 6 with flow processing continuing with respect to node D.

Reference is now being made to the flow diagram of FIG. 7 which is a continuation of the flow diagram of FIG. 6 with flow processing continuing with respect to node D.

At step 520, the user enters a new set of device configuration settings.

At step 522, the new device configuration settings are associated with this user.

At step 524, a record of these device configuration settings associated with this user is added to the database of device configuration settings. Thereafter, processing continues with respect to node F (of FIG. 6) wherein, at step 518, the device is configured to the user's device configuration settings. Once the device is configured for the user, in this embodiment, further processing stops.

Figure 8:
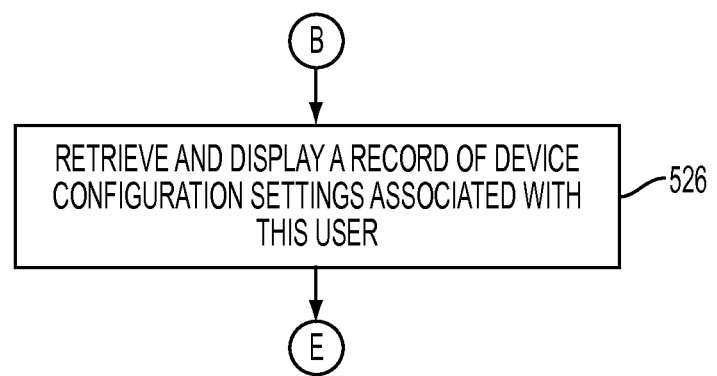
FIG. 8 is a continuation of the flow diagram of FIG. 5 with flow processing continuing with respect to node B.

Reference is now being made to the flow diagram of FIG. 8 which is a continuation of the flow diagram of FIG. 5 with flow processing continuing with respect to node B.

If, at step 510, there is a match and the user's identity confirmed and processing continues with respect to node B of FIG. 8.

At step 526, a record of device configuration settings associated with the identified user is retrieved from the database and displayed on the graphical user interface of workstation 410 of FIG. 4. Once the retrieved record of device configuration settings has been displayed for the user, processing continues with respect to node E wherein, at step 516, the user can accept or reject the displayed device configuration settings. If the user accepts the displayed device configuration settings then, at step 518, the print system is configured to these settings. If the user rejects the displayed configuration settings then, at step 520, the user can enter a new set of device configuration settings. The new settings are associated, at step 522, with this user. The new configuration settings are added, at step 524, to a record in the database of device configuration settings. At step 518, the device is then configured to these settings and, in this embodiment, further processing stops.

It should be appreciated that the flow diagrams hereof are illustrative. One or more of the operative steps illustrated in any of the flow diagrams may be performed in a different order. Other operations may be added, modified, enhanced, condensed, or consolidated. Such operative variations are intended to fall within the scope of the appended claims. All or portions of the flow diagrams may be implemented partially or fully in hardware in conjunction with machine executable instructions.

Example Vein Pattern Processing System

Figure 9:
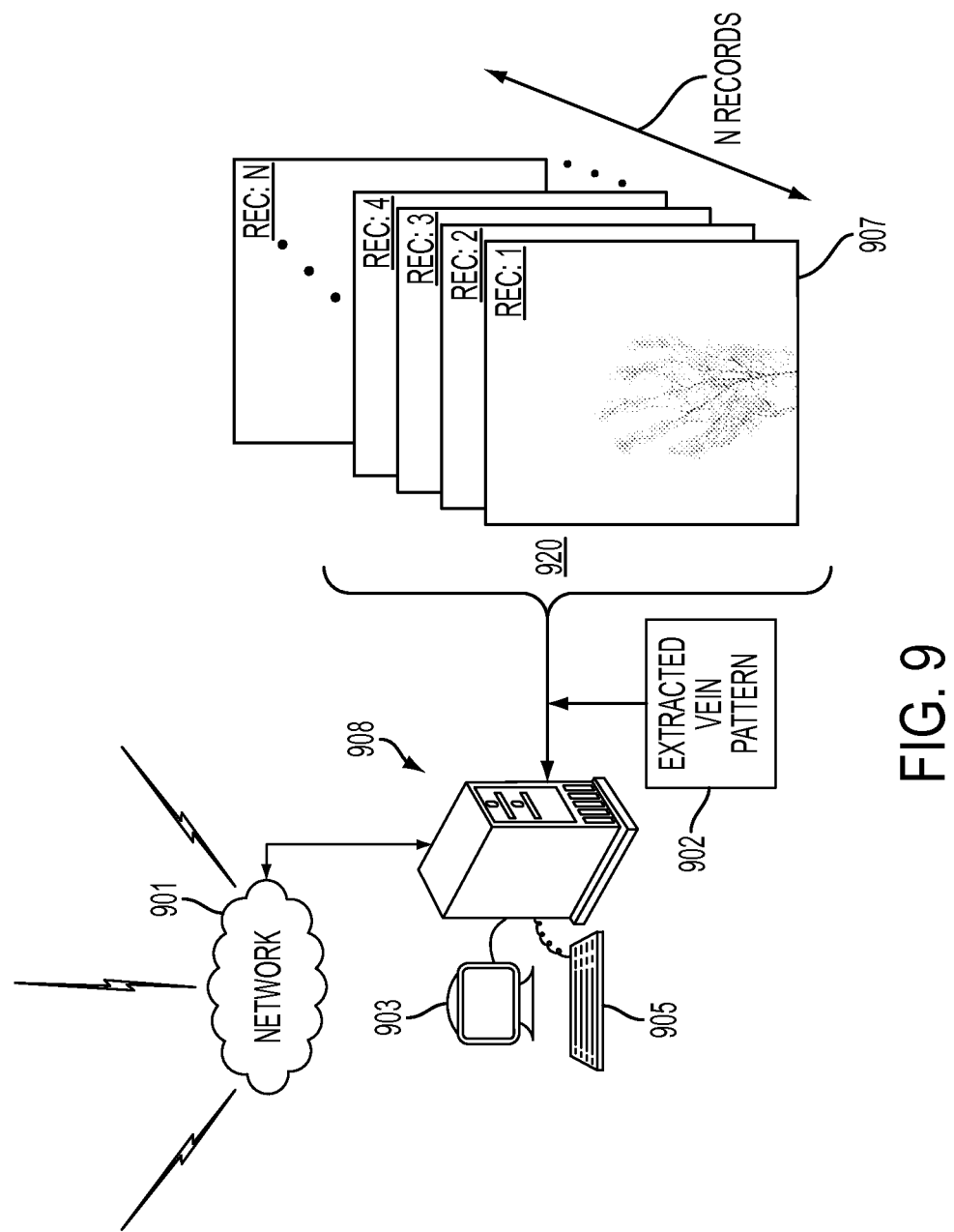
FIG. 9 illustrates an example networked computer database system capable of retrieving records of reference subcutaneous vein patterns and comparing reference vein patterns with a vein patterns extracted from an IR image or IR video such that a user's identity can be determined.

Reference is now being made to FIG. 9 which illustrates an example networked computer system for retrieving records from a database of reference subcutaneous vein patterns and for comparing the reference vein patterns with the vein patterns extracted from an IR image. Although the embodiment of FIG. 9 are shown and discussed with respect to a subcutaneous vein pattern of a human hand, should be understood that subcutaneous vein patterns of other portions of the body can be used for identification purposes. Such an embodiment directed to a human hand, as shown and discussed with respect to a user identification system for device configuration (of FIG. 4) is but one portion of the body from which vein patterns can be extracted from IR images for comparison and identification purposes.

In FIG. 9, workstation 908 is shown comprising a monitor 903, a keyboard 905, a mouse (not shown), and a database of records 900. Workstation 908 is in communication with print system device 400 of FIG. 4 and further in communication with the IR image scanner 406 over network 901. The workstation further comprises a computer readable medium (not shown) and is capable of executing machine readable program instructions for performing one or more aspects of the present method. Computer system 908 includes a communications interface (not shown) which effectuates the transfer of data to/from the IR image system 406 of the print system device 400 of FIG. 4. Example communications interfaces include a modem, a network interface, a communications port, a PCMCIA slot and card, etc. Workstation 908 may be placed in communication with any number of document reproduction systems by way of network 1001 including the workstation 1002 of FIG. 10. Alternatively, all or part of system 908 and/or the database of records 900 resides in print system device 400 of FIG. 4. Some or all of the functionality of the system of FIG. 9 may be integrated with the print system device 400.

A plurality of records, shown collectively at 900, each contain reference subcutaneous vein patterns for comparison purposes. Each vein pattern record is associated with a known identity. Such records have been created and assembled in either a cooperative or non-cooperative manner. Records are stored in a storage device (not shown) and are addressable by a central processing unit (CPU) of workstation 908 either directly or in response to a query. A first record in the database is shown containing a first reference subcutaneous vein pattern of a known individual. The extracted vein pattern which is intended to be identified via an image comparison is shown at 902. The original IR image of the unidentified target individual resides on a storage device internal to the workstation computer or may be retrieved from a remote device over network 901. The IR image and/or the image of the extracted vein patterns may be stored there along with any bitmaps, lists, objects, and other information associated with the captured IR image which may facilitate a database search for matching records for comparison purposes. Such additional information may comprise a time/date stamp, location where the IR image was captured, the configuration of the IR image system employed, individual intensity values of each of the pixels, and other formula and data required for processing in accordance with the teachings hereof. Also stored in a storage device or memory, internal to workstation 908, are software tools for performing the comparisons of the image of the extracted vein patterns with images of reference vein patterns, in accordance herewith, to identify a particular individual. Image manipulation software enables an operator of system 908 to view an image containing the vein patterns, such as the image of FIG. 1, on monitor 903 and edit, crop, or otherwise manipulate the image via user interface 905. Computer workstation 908 retrieves image 902 from storage and, in various embodiments, serially retrieves stored records 900 of reference vein patterns for comparison purposes.

In this embodiment, the vein patterns contained in a first record 907 are retrieved along with any of the identification information for this first record. The retrieved information is displayed on graphical display device 903 for review by a user. In one simple embodiment, the operator of system 908 overlays the extracted vein pattern 902 with the retrieved vein pattern 907 for a visual comparison using keyboard 905. The operator then makes a decision whether this particular vein pattern matches the extracted vein pattern. If there is a match then the identity of the user is confirmed. If there is not a match, a next record of a next vein pattern (REC:2) is retrieved from the plurality of records 900 for a visual comparison. In another embodiment, image comparison is performed automatically using techniques with are well established in the arts and the operator of system 908 is notified upon the completion of the search and comparison program. In another embodiment, entire bitmaps of images of vein patterns are logically added together to determine a match. Such a logical addition teaching, two or more bitmaps are overlaid, on a pixel-by-pixel basis, for comparison purposes. Such alternative embodiments are intended to fall within the scope of the appended claims.

Example Networked Workstation

Figure 10:
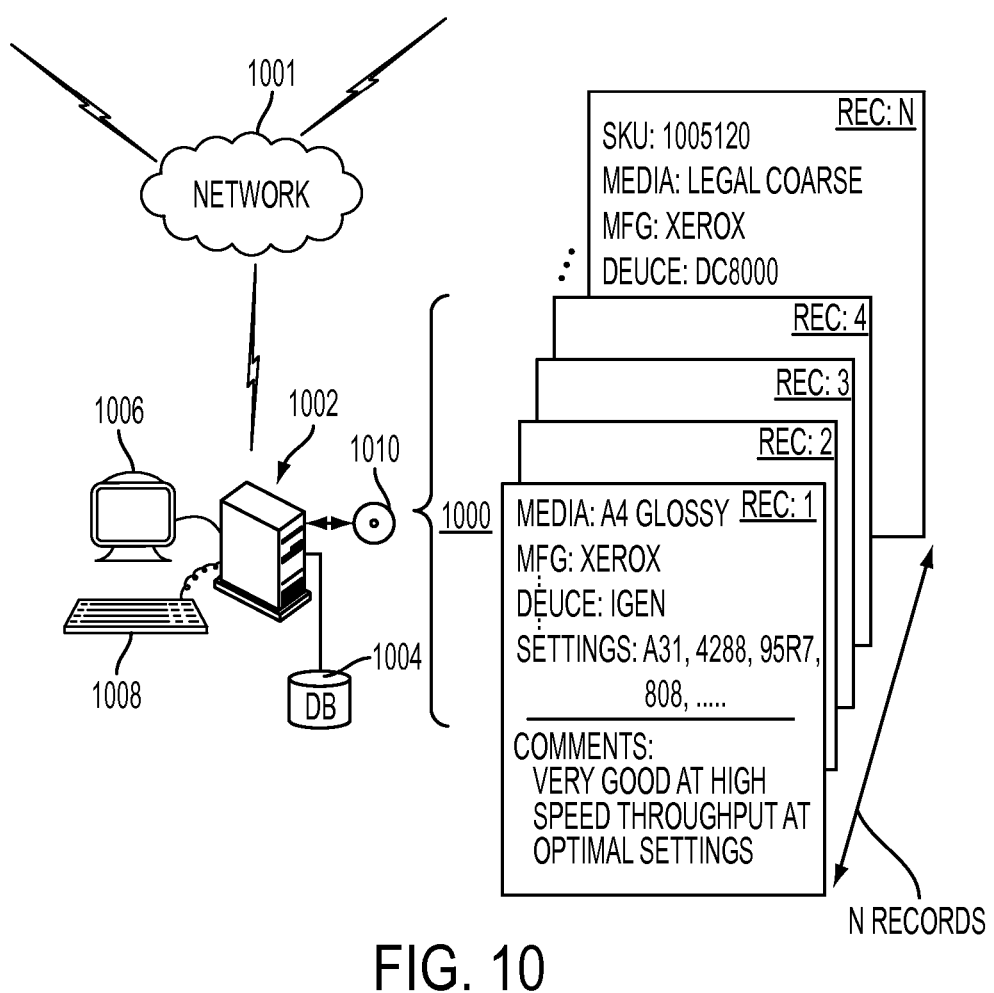
FIG. 10 illustrates an example networked computer database system for retrieving records of device configuration settings which have been associated with an identified user of the print system device of FIG. 4.

Reference is now being made to FIG. 10 which illustrates an example networked computer system for retrieving records of device configuration settings which have been associated with an identified user of the print system device of FIG. 4.

Workstation 1002 incorporates a display 1006 such as a CRT or LCD, a keyboard 1008, and a computer readable medium 1010 containing machine readable program instructions for performing one or more aspects of the present method. The computer readable medium can also be used to store, transfer, and retrieve records. The computer system 1002 includes a communications interface (not shown) which effectuates the transfer of data to the print system of FIG. 4. Example communications interfaces include a modem, a network interface, a communications port, a PCMCIA slot and card, etc. Workstation 702 may be placed in communication with any number of document reproduction systems by way of network 1001. Workstation 1002 is capable of retrieving any of the plurality of records, collectively at 1000, containing device configuration settings stored in database 1004. Any fields contained in any of the records retrieved from database 1994 can be displayed on display monitor device 1006 and/or the monitor 412 of workstation 410 of FIG. 4 for a user acceptance or rejection. Further, the user/operator of either the workstation 1002 and/or the workstation 410 may edit or modify any of the displayed device configuration settings. The accepted set of device configuration settings are communicated to the database system of workstation 1002 such that records in database 1004 can be updated or new records added thereto.

Database 1004 is one known in the arts capable of indexing a plurality of records, storing records, receiving and interpreting a query, and retrieving one or more records in response to a query. It should be understood that a record, as used herein, comprises any software data structure capable of containing information which can be indexed, stored, searched, and retrieved by a database engine in response to a query. The database is also capable of adding new records and updating existing records already stored. Database construction, optimization, indexing, and record retrieval techniques are well known in the arts. Thus, a further discussion as to a specific database or a specific implementation thereof is omitted. One of ordinary skill would be able to readily acquire and setup a database in their own environments and use the database to store, index, and retrieve matching records based on an ordered sequence of alphanumeric codes and provide matching record(s) to the requesting process in response to that query. Alternatively, all or part of system 1002 and/or the database 1004 resides in print system device 400 of FIG. 4. Some or all of the functionality of the database may be integrated with the print system device 400. Some of the functionality of controllers responsible for configuring the print system device to the device configuration settings may reside on a computer system remotely located over a network 1001. The information contained in any of the records stored in the database of FIG. 10 is illustrative.

Shown stored with the first record are setting codes: A31, 42BB, 95R7, and B08. These codes are intended to represent coded device settings which a device controller would use to configure one or more sub-systems of the print system device of FIG. 4. Strings can be easily associated with these codes such that the appropriate values are displayed for the operator on the display 1006 in the appropriate language on any of the display portions. Converting the settings to codes prior to storage helps minimize the amount of storage space required to save all the values of all the window screens which are saved by a user for a particular customized workflow process. Also shown are other illustrative fields which are associated with the device configuration setting codes. It should be appreciated that the records of device configuration settings can be arranged using any of a wide variety of data fields. Such a record configuration would necessarily depend on the system wherein the teachings hereof find their intended uses.

The computer system of FIG. 10 further includes a communications interface (not shown) which effectuates the transfer of data to external devices via network 1001. Examples communications interfaces include: a modem, a network interface (such as an Ethernet card), a communications port, a PCMCIA slot and card, etc. Print system device 400 of FIG. 4 may be networked to computer system 1002 and database 1004. Computer 1002 may be placed in communication with any number of document reproduction systems by way of a connection to network 1001. Many aspects of the internet are commonly known. A further discussion as to the construction and/or operation of the internet itself has been omitted herein. Suffice it to say, data is transmitted in packets by a network of servers connected via a plurality of communication links. One device with open access to the internet can communicate with another device with open access to the internet through such data packets using established protocols. Data is transferred via the internet in the form of signals which may be, for example, electronic, electromagnetic, optical, or other signals. These signals are provided to a communications device such as a network server, which transmits and receives data packets by means of wire, cable, fiber optic, phone line, cellular link, RF, satellite, or any other medium or communications link known in the arts.

Example Displayed Screen of Configuration Settings

Figure 11:
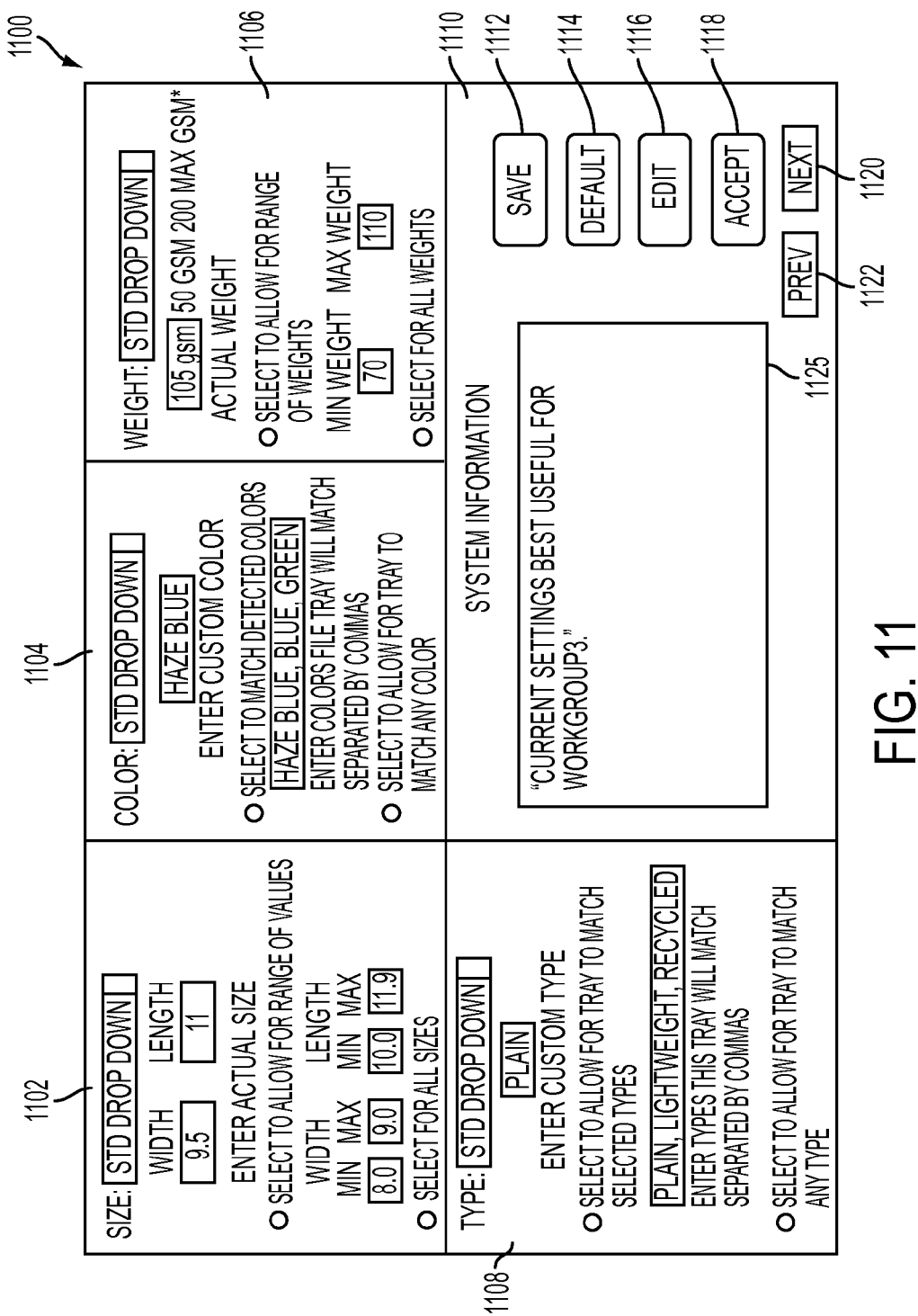
FIG. 11 illustrates one embodiment of a view of a selectable menu of displayed device configuration settings in accordance with one embodiment hereof.

Reference is now being made to FIG. 11 which illustrates one embodiment of a view of a selectable menu of displayed device configuration settings in accordance with one embodiment hereof. The displayed device configuration settings are shown with respect to media attributes of paper/stock retained in the paper trays 422 of print system device 400. In accordance with one example embodiment hereof, the operator modifies the displayed settings via the keyboard 414 and mouse 418 of workstation 410.

Various screen portions of an example record of device configuration settings which have been displayed on a display device of print system device 400 will now be described in greater detail. It should be understood that the embodiment shown and described regarding the displayed portions of the workstation display are illustrative and should not be viewed as being limiting. Other variations and arrangements and options regarding device configuration settings shown to the user/operator on the display screen will vary depending on the complexity of the print system device, the different setting combinations, selectable options, and the intended uses thereof.

Display portion 1102 enables the operator to modify device configuration settings relating to print media size. If the print media has a standard size, the operator may actuate a drop down menu containing a list of print media sizes and select the size for the media loaded in the paper tray. A wildcard option allows any print media presently retained in a particular paper tray to be used for the print job no matter what paper was specified. As a quality control check, a controller insures that the attributes sensed by paper tray sensors for the media loaded in the paper tray fall within acceptable parameters.

Display portion 1104 enables the operator to modify device configuration settings relating to print media color. If the print media has a standard color, the operator may actuate a drop down menu containing a list of standard colors and select the appropriate color for the print media loaded in the paper tray, or enter a value for color.

Display portion 1106 enables the operator to modify device configuration settings relating to print media weight. If the print media has a standard weight, the operator may actuate a drop down menu containing a list of standard weights and select the weight for the print media loaded in the paper tray.

Display portion 1108 enables the operator to modify device configuration settings relating to print media type. If the print media has a standard type, the operator may actuate a drop down menu containing a list of standard types and select the type for the print media loaded in the paper tray.

Display portion 1110 includes a text area 1125 for displaying lines of text messages associated with the currently displayed device configuration settings. Such a section provides an area for the presentation to the operator of information stored with the attributes currently displayed. Text messages may, for instance, alert the operator to nuances in any of the displayed configuration settings or provide additional insight that the user may wish to consider when configuring the device for a certain workflow process. The operator can scroll through the messages using the NEXT 1120 and PREV 1122 buttons. It should be clear that the information displayed in FIG. 11 represents only a single screen worth of print media attributes. The NEXT and PREV buttons are used by the user/operator to bring up other screens containing additional print media attributes. The user/operator can scroll through a plurality of such screens. Additional screens will contain other selectable device specific settings. Other screens will include user selectable workflow process settings such as double-sided, collate, staple, and the like. An entire set of customized settings are intended to be associated with the code sequence, as described herein further, and collectively stored/retrieved in accordance with the teachings hereof.

Display portion 1110 further includes a SAVE 1112, a DEFAULT 1114, an EDIT 1116, and an ACCEPT 1118 button. The operator may elect to edit any of the displayed settings by pressing EDIT and hitting, for example, the TAB key to jump over to the appropriate displayed setting. The operator would modify the setting to the desired value. The ACCEPT button is used if the operator is satisfied with the displayed device configuration settings. The user hitting the ACCEPT button 318 would cause the special purpose computer to being the process of configuring the print system device to the current settings. The special purpose controller would interpret the system settings and signal the various device controllers to make the necessary subsystem adjustments according to the selected print media attributes and the desired workflow intended to be performed. If, on the other hand, the operator is not satisfied with the currently displayed device configuration settings or with the information contained in one of the displayed windows, the user would press the DEFAULT button and the system would retrieve and display a set of default configuration settings. An ESC option, for example, would load the defaults for all window menus. A SAVE button enables the user to save the current device configuration to a storage device or to the database 1004 of FIG. 10.

Additionally, an alarm sound and/or a message displayed on the user interface in the instance wherein the user is identified and is not authorized to use this device. An alarm or signal may be communicated to a remote device if the user is unable to be identified or is otherwise attempting to perform an operation with the print system device that they are not authorized or trained to perform.

It should be understood that the workstation has specialized software configured to display a wide variety of numeric values, text, scroll bars, dials, slideable menu bars, pull-down menus, selectable buttons, and the like, for entering, selecting, modifying, accepting any of the displayed information. The embodiment shown is only illustrative and may include any other functionality which any display device known in the arts is capable of displaying. Screen display 1100 merely illustrates one example embodiment. Software to configure a user interface or any portion thereof to display/enter/accept data is highly customizable and may be device dependent. Such software is usually considered proprietary. Therefore, a further discussion regarding specific programming techniques and software algorithms to program or otherwise configure a display device to display a certain set of settings is omitted herein. One of ordinary skill would program their display portions for a specific system in a particular print/copy job environment.

OTHER VARIATIONS

It should be appreciated that some or all of the functionality of the methods disclosed herein may be performed, in whole or in part, by components internal to any of the computer workstations shown or by a special purpose computer system comprising a single piece of hardware such as an ASIC, electronic circuit, and the like. It is also contemplated that one or more aspects of the present method may be implemented on a dedicated system and may also be practiced in distributed computing environments where tasks are performed by remote devices that are linked through a network. Such a special purpose processor is capable of executing machine executable program instructions and may comprise any of a micro-processor, micro-controller, ASIC, electronic circuit, or any combination thereof. A special purpose computer system would include a processor for executing machine executable program instructions for carrying out all or some of the present method and a memory which stores machine readable instructions for performing the present method. A secondary memory may be utilized for enabling programs and/or machine executable instructions to be loaded onto the processor. Such mechanisms may include, for example, a storage unit adapted to exchange data through an interface which effectuates the transfer of software and data. Such a system would include a communications interface to allow data to be transferred between the system and external devices. Example interfaces include a modem, a network card such as an Ethernet card, a communications port, a PCMCIA slot and card, etc. Software and data transferred via the communications interface are in the form of signals which may be electronic, electromagnetic, optical, or other forms of signals capable of being received by the communications interface. These signals are provided to the communications interface using wire, cable, fiber optic, phone line, cellular link, RF, memory, or other means known in the arts. The teachings hereof can be implemented in hardware or software using any known or later developed systems, structures, devices, and/or software by those skilled in the applicable art without undue experimentation from the functional description provided herein with a general knowledge of the relevant arts.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described in the flow diagrams. Additionally, the article of manufacture may be included as part of an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for identifying an individual in an IR image or IR video, the method comprising:

collecting intensity values at N wavelength bands for each pixel in any of: an IR image and IR video, said intensity values being collected using a IR imaging system comprising an IR detector and an IR Illuminator, wherein said IR detector is a single IR detector, said intensity value comprising:

$$I_c(j) = \alpha \int_{\lambda_1}^{\lambda_2} I_s(\lambda)[T_G^2(\lambda)R_o(\lambda) + \eta R_G(\lambda)]T_L(\lambda)D(\lambda)d\lambda + I_b,$$

where $j=1, \ldots, N$, such that $j$ is the $j^{th}$ IR band from the illuminator that is illuminating, $\alpha$ is a constant that depends on an angle and distance from the illumination source, an attenuation of an IR wave in the air, and an integration time of the detecting device, $I_b$ is an intensity from a background light source such as that from the IR component of sunlight, $I_s(\lambda)$ is a calculated correspondence of a measured intensity, $I_m$, such that, if the calculated intensity with a particular reflectance agrees with the object in the measured intensity, the correlation will be high (close to 1), otherwise the correlation will be small (close to 0 or negative), $T_L(\lambda)$ is a transmittance of the filter, $R_o(\lambda)$ is a reflectance of an object detected by the IR detection device, $R_G(\lambda)$ and $T_G(\lambda)$ are a reflectance and a transmittance of glass or other types of material between the target object and the illumination source and camera, otherwise $R_o(\lambda)=0$ and $T_G(\lambda)=1$, constant $\eta$ is a measure of the percentage of light from the IR illuminator reflected from glass and received by the detector, otherwise $\eta=0$, and where $T_L(\lambda)=1$, and $D(\lambda)$ is a responsivity of the detection device;

using said intensity values to identify pixels of human tissue in said IR image or said IR video;

extracting a subcutaneous vein pattern from said identified human tissue;

retrieving a reference vein pattern from a database; and comparing said extracted subcutaneous vein pattern with said reference vein pattern to identify the individual in said IR image.

2. A method for identifying an individual in an IR image or IR video, the method comprising:

collecting intensity values at N wavelength bands for each pixel in any of: an IR image and IR video, said intensity values being collected using a IR imaging system comprising an IR detector and an IR Illuminator, wherein said IR detector has N band pass filters (N≧1), and said IR Illuminator comprises a single IR illuminator covering a wavelength range of those filters, said intensity value comprising:

$$I_c(i) = \alpha \int_{\lambda_1}^{\lambda_2} I_s(\lambda)[T_G^2(\lambda)R_o(\lambda) + \eta R_G(\lambda)]T_L^i(\lambda)D(\lambda)d\lambda + I_b,$$

where $i=1, \ldots, N$, such that $i$ is the $i^{th}$ IR band pass filter, $\alpha$ is a constant that depends on an angle and distance from the illumination source, an attenuation of an IR wave in the air, and an integration time of the detecting device, $I_b$ is a background intensity, $I_s(\lambda)$ is a calculated correspondence of a measured intensity, $I_m$, such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from the illuminator reflected from glass and received by the detector, otherwise $\eta=0$, $T_L^i(\lambda)$ is a transmittance of the $i^{th}$ filter, and $D(\lambda)$ is a responsivity of the detecting device;

using said intensity values to identify pixels of human tissue in said IR image or said IR video;

extracting a subcutaneous vein pattern from said identified human tissue;

retrieving a reference vein pattern from a database; and comparing said extracted subcutaneous vein pattern with said reference vein pattern to identify the individual in said IR image.

3. A method for identifying an individual in an IR image or IR video, the method comprising:

collecting intensity values at N wavelength bands for each pixel in any of: an IR image and IR video, said intensity values being collected using a IR imaging system comprising an IR detector and an IR Illuminator, wherein said IR detector comprises a total of N detectors (N≧1) having a total of I filters (I≧1), and the IR Illuminator comprises a total of J illuminators (J≧1) such that the combination of I filters and J illuminators covers a desired wavelength range, said intensity value comprising:

$$I_c(i) = \alpha \int_{\lambda_1}^{\lambda_2} I_s^j(\lambda)[T_G^2(\lambda)R_o(\lambda) + \eta R_G(\lambda)]T_L(\lambda)D(\lambda)d\lambda + I_b,$$

where $i=1, \ldots, I$, such that $i$ is the $i^{th}$ IR band from the $j^{th}$ illuminator that is illuminating, $\alpha$ is a constant that depends on an angle and distance from the illumination source, an attenuation of an IR wave in the air, and an integration time of the detecting device, $I_b$ is an intensity from a background light source such as that from the IR component of sunlight, $I_s^j(\lambda)$ is a calculated correspondence of a measured intensity, $I_m^j$, from the $j^{th}$ illuminator such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $T_L(\lambda)$ is a transmittance of the filter, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from the IR illuminator reflected from glass and received by the detector, otherwise $\eta=0$, and where $T_L(\lambda)=1$, and $D(\lambda)$ is a responsivity of the detection device;

using said intensity values to identify pixels of human tissue in said IR image or said IR video;

extracting a subcutaneous vein pattern from said identified human tissue;

retrieving a reference vein pattern from a database; and comparing said extracted subcutaneous vein pattern with said reference vein pattern to identify the individual in said IR image.

4. A method for identifying an individual in an IR image or IR video, the method comprising:

collecting intensity values at N wavelength bands for each pixel in any of: an IR image and IR video, said intensity values being collected using a IR imaging system comprising an IR detector and an IR Illuminator, wherein said IR detector comprises a total of N narrow band detection devices (N≧1) having a total of I filters (I≧1)

and the IR Illuminator comprises a total of J illuminators (J≧1), said intensity value comprising:

$$I_c(i) = \alpha \int_{\lambda_1}^{\lambda_2} I_s(\lambda)[T_G^2(\lambda)R_o(\lambda) + \eta R_G(\lambda)]T_L(\lambda)D^i(\lambda)d\lambda + I_b,$$

where i=1, ..., I, such that i is the $i^{th}$ IR band from the $j^{th}$ illuminator that is illuminating, $\alpha$ is a constant that depends on an angle and distance from the illumination source, an attenuation of an IR wave in the air, and an integration time of the detecting device, $I_b$ is an intensity from a background light source such as that from the IR component of sunlight, $I_s(\lambda)$ is a calculated correspondence of a measured intensity, $I_m$, such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $T_L(\lambda)$ is a transmittance of the filter, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from the IR illuminator reflected from glass and received by the detector, otherwise $\eta=0$, and $T_L(\lambda)=1$, and $D^i(\lambda)$ is a responsivity of the detection device at the $i^{th}$ band;

using said intensity values to identify pixels of human tissue in said IR image or said IR video;

extracting a subcutaneous vein pattern from said identified human tissue;

retrieving a reference vein pattern from a database; and comparing said extracted subcutaneous vein pattern with said reference vein pattern to identify the individual in said IR image.

5. The method of claim 4, wherein upon identification of said individual, further comprising:

retrieving device configuration settings from a database based upon said identification; and configuring a document reproduction device to said retrieved configuration settings.

6. The method of claim 4, further comprising:

classifying pixels in said IR image according to any of: a Ratio Method, a Correlation Method, and a Best Fitting Reflectance Method; and using said classified pixels to detect and extract said vein pattern.

7. A system for identifying an individual in an IR image or IR video, the system comprising:

an IR imaging system comprising an IR detection device and an IR Illuminator;

a memory and a storage medium; and a processor in communication with and said storage medium and said memory, said processor executing machine readable instructions for performing the method of:

using said IR imaging system to collect intensity values at N wavelength bands for each pixel in any of: an IR image and IR video, wherein said IR detector is a single IR detector, said intensity value comprising:

$$I_c(j) = \alpha \int_{\lambda_1}^{\lambda_2} I_s(\lambda)[T_G^2(\lambda)R_o(\lambda) + \eta R_G(\lambda)]T_L(\lambda)D(\lambda)d\lambda + I_b,$$

where j=1, ..., N, such that j is the $j^{th}$ IR band from the illuminator that is illuminating, $\alpha$ is a constant that depends on an angle and distance from the illumination source, an attenuation of an IR wave in the air, and an integration time of the detecting device, $I_b$ is an intensity from a background light source such as that from the IR component of sunlight, $I_s(\lambda)$ is a calculated correspondence of a measured intensity, $I_m$, such that, if the calculated intensity with a particular reflectance agrees with the object in the measured intensity, the correlation will be high (close to 1), otherwise the correlation will be small (close to 0 or negative), $T_L(\lambda)$ is a transmittance of the filter, $R_o(\lambda)$ is a reflectance of an object detected by the IR detection device, $R_o(\lambda)$ and $T_G(\lambda)$ are a reflectance and a transmittance of glass or other types of material between the target object and the illumination source and camera, otherwise $R_o(\lambda)=0$ and $T_G(\lambda)=1$, constant $\eta$ is a measure of the percentage of light from the IR illuminator reflected from glass and received by the detector, otherwise $\eta=0$, and where $T_L(\lambda)=1$, and $D(\lambda)$ is a responsivity of the detection device;

using said intensity values to identify pixels of human tissue in said IR image or said IR video;

extracting a subcutaneous vein pattern from said identified human tissue;

retrieving a reference vein pattern from a database; and comparing said extracted subcutaneous vein pattern with said reference vein pattern to identify the individual in said IR image.

8. A system for identifying an individual in an IR image or IR video, the system comprising:

an IR imaging system comprising an IR detection device and an IR Illuminator;

a memory and a storage medium; and a processor in communication with and said storage medium and said memory, said processor executing machine readable instructions for performing the method of:

using said IR imaging system to collect intensity values at N wavelength bands for each pixel in any of: an IR image and IR video, wherein said IR detector has N band pass filters (N≧1), and said IR Illuminator comprises a single IR illuminator covering a wavelength range of those filters, said intensity value comprising:

$$I_c(i) = \alpha \int_{\lambda_1}^{\lambda_2} I_s(\lambda)[T_G^2(\lambda)R_o(\lambda) + \eta R_G(\lambda)]T_L^i(\lambda)D(\lambda)d\lambda + I_b,$$

where i=1, ..., N, such that i is the $i^{th}$ IR band pass filter, $\alpha$ is a constant that depends on an angle and distance from the illumination source, an attenuation of an IR wave in the air, and an integration time of the detecting device, $I_b$ is a background intensity, $I_s(\lambda)$ is a calculated correspondence of a measured intensity, $I_m$, such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from the illuminator reflected from glass and received by the detector, otherwise $\eta=0$, $T_L^i(\lambda)$ is a transmittance of the $i^{th}$ filter, and $D(\lambda)$ is a responsivity of the detecting device;

using said intensity values to identify pixels of human tissue in said IR image or said IR video;

extracting a subcutaneous vein pattern from said identified human tissue;

retrieving a reference vein pattern from a database; and comparing said extracted subcutaneous vein pattern with said reference vein pattern to identify the individual in said IR image.

9. A system for identifying an individual in an IR image or IR video, the system comprising:

an IR imaging system comprising an IR detection device and an IR Illuminator;
a memory and a storage medium; and
a processor in communication with and said storage medium and said memory, said processor executing machine readable instructions for performing the method of:
using said IR imaging system to collect intensity values at N wavelength bands for each pixel in any of: an IR image and IR video, wherein said IR detector comprises a total of N detectors (N≧1) having a total of I filters (I≧1), and the IR Illuminator comprises a total of J illuminators (J≧1) such that the combination of I filters and J illuminators covers a desired wavelength range, said intensity value comprising:

$$I_c(i) = \alpha \int_\lambda^{\lambda_2} I_s^j(\lambda)[T_G^2(\lambda)R_o(\lambda) + \eta R_G(\lambda)]T_L(\lambda)D(\lambda)d\lambda + I_b,$$

where i=1, ..., I, such that i is the $i^{th}$ IR band from the $j^{th}$ illuminator that is illuminating, $\alpha$ is a constant that depends on an angle and distance from the illumination source, an attenuation of an IR wave in the air, and an integration time of the detecting device, $I_b$ is an intensity from a background light source such as that from the IR component of sunlight, $I_s^j(\lambda)$ is a calculated correspondence of a measured intensity, $I_m^j$, from the $j^{th}$ illuminator such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $T_L(\lambda)$ is a transmittance of the filter, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from the IR illuminator reflected from glass and received by the detector, otherwise $\eta=0$, and where $T_L(\lambda)=1$, and $D(\lambda)$ is a responsivity of the detection device;
using said intensity values to identify pixels of human tissue in said IR image or said IR video;
extracting a subcutaneous vein pattern from said identified human tissue;
retrieving a reference vein pattern from a database; and
comparing said extracted subcutaneous vein pattern with said reference vein pattern to identify the individual in said IR image.

10. A system for identifying an individual in an IR image or IR video, the system comprising:
an IR imaging system comprising an IR detection device and an IR Illuminator;
a memory and a storage medium; and
a processor in communication with and said storage medium and said memory, said processor executing machine readable instructions for performing the method of:
using said IR imaging system to collect intensity values at N wavelength bands for each pixel in any of: an IR image and IR video, wherein said IR detector comprises a total of N narrow band detection devices (N≧1) having a total of I filters (I≧1) and the IR Illuminator comprises a total of J illuminators (J≧1), said intensity value comprising:

$$I_c(i) = \alpha \int_\lambda^{\lambda_2} I_s(\lambda)[T_G^2(\lambda)R_o(\lambda) + \eta R_G(\lambda)]T_L(\lambda)D^i(\lambda)d\lambda + I_b,$$

where i=1, ..., I, such that i is the $i^{th}$ IR band from the $j^{th}$ illuminator that is illuminating, $\alpha$ is a constant that depends on an angle and distance from the illumination source, an attenuation of an IR wave in the air, and an integration time of the detecting device, $I_b$ is an intensity from a background light source such as that from the IR component of sunlight, $I_s(\lambda)$ is a calculated correspondence of a measured intensity, $I_m$, such that, if the calculated intensity with a particular reflectance agrees with the object in the measured intensity, the correlation will be high (close to 1), otherwise the correlation will be small (close to 0 or negative), $R_o(\lambda)$ is a reflectance of an object detected by the IR detection device, $T_L(\lambda)$ is a transmittance of the filter, $R_G(\lambda)$ and $T_G(\lambda)$ are a reflectance and a transmittance of glass, otherwise $R_G(\lambda)=0$ and $T_G(\lambda)=1$, constant $\eta$ is a measure of the percentage of light from the IR illuminator reflected from glass and received by the detector, otherwise $\eta=0$, and $T_L(\lambda)=1$, and $D^i(\lambda)$ is a responsivity of the detection device at the $i^{th}$ band;
using said intensity values to identify pixels of human tissue in said IR image or said IR video;
extracting a subcutaneous vein pattern from said identified human tissue;
retrieving a reference vein pattern from a database; and
comparing said extracted subcutaneous vein pattern with said reference vein pattern to identify the individual in said IR image.

11. The system of claim 10, wherein upon identification of said individual, further comprising:
retrieving device configuration settings from a database based upon said identification; and
configuring a document reproduction device to said retrieved configuration settings.

12. The system of claim 10, further comprising:
classifying pixels in said IR image according to any of: a Ratio Method, a Correlation Method, and a Reflectance Method; and
using said classified pixels to detect and extract said vein pattern.

13. The method of claim 1, wherein upon identification of said individual, further comprising:
retrieving device configuration settings from a database based upon said identification; and
configuring a document reproduction device to said retrieved configuration settings.

14. The method of claim 1, further comprising:
classifying pixels in said IR image according to any of: a Ratio Method, a Correlation Method, and a Best Fitting Reflectance Method; and
using said classified pixels to detect and extract said vein pattern.

15. The method of claim 2, wherein upon identification of said individual, further comprising:
retrieving device configuration settings from a database based upon said identification; and
configuring a document reproduction device to said retrieved configuration settings.

16. The method of claim 2, further comprising:
classifying pixels in said IR image according to any of: a Ratio Method, a Correlation Method, and a Best Fitting Reflectance Method; and
using said classified pixels to detect and extract said vein pattern.

17. The method of claim 3, wherein upon identification of said individual, further comprising:
retrieving device configuration settings from a database based upon said identification; and configuring a document reproduction device to said retrieved configuration settings.

18. The method of claim 3, further comprising:

classifying pixels in said IR image according to any of: a Ratio Method, a Correlation Method, and a Best Fitting Reflectance Method; and using said classified pixels to detect and extract said vein pattern.

19. The system of claim 7, wherein upon identification of said individual, further comprising:

retrieving device configuration settings from a database based upon said identification; and configuring a document reproduction device to said retrieved configuration settings.

20. The system of claim 7, further comprising:

classifying pixels in said IR image according to any of: a Ratio Method, a Correlation Method, and a Reflectance Method; and using said classified pixels to detect and extract said vein pattern.

21. The system of claim 8, wherein upon identification of said individual, further comprising:

retrieving device configuration settings from a database based upon said identification; and configuring a document reproduction device to said retrieved configuration settings.

22. The system of claim 8, further comprising:

classifying pixels in said IR image according to any of: a Ratio Method, a Correlation Method, and a Reflectance Method; and using said classified pixels to detect and extract said vein pattern.

23. The system of claim 9, wherein upon identification of said individual, further comprising:

retrieving device configuration settings from a database based upon said identification; and configuring a document reproduction device to said retrieved configuration settings.

24. The system of claim 9, further comprising:

classifying pixels in said IR image according to any of: a Ratio Method, a Correlation Method, and a Reflectance Method; and using said classified pixels to detect and extract said vein pattern.

* * * * *